US007818342B2

(12) United States Patent
Stuhec

(10) Patent No.: US 7,818,342 B2
(45) Date of Patent: Oct. 19, 2010

(54) TRACKING USAGE OF DATA ELEMENTS IN ELECTRONIC BUSINESS COMMUNICATIONS

(75) Inventor: Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 777 days.

(21) Appl. No.: 11/285,368

(22) Filed: Nov. 21, 2005

(65) Prior Publication Data

US 2006/0106755 A1     May 18, 2006

Related U.S. Application Data

(63) Continuation of application No. 10/986,628, filed on Nov. 12, 2004, now Pat. No. 7,711,676.

(51) Int. Cl.
*G06F 7/00*     (2006.01)
(52) U.S. Cl. .................................................. 707/777
(58) Field of Classification Search ................ 707/777
See application file for complete search history.

(56) References Cited

U.S. PATENT DOCUMENTS

| | | |
|---|---|---|
| 4,714,995 A | 12/1987 | Materna et al. |
| 4,864,502 A | 9/1989 | Kucera et al. |
| 5,089,814 A | 2/1992 | Deluca |
| 5,130,924 A | 7/1992 | Barker et al. |
| 5,339,392 A | 8/1994 | Risberg et al. |
| 5,444,841 A | 8/1995 | Glaser et al. |
| 5,694,598 A | 12/1997 | Durand et al. |
| 5,717,923 A | 2/1998 | Dedrick |
| 5,797,137 A | 8/1998 | Golshani et al. |
| 5,899,988 A | 5/1999 | Depledge et al. |
| 6,018,742 A | 1/2000 | St. John Herbert, III |
| 6,124,391 A | 9/2000 | Sun et al. |

(Continued)

FOREIGN PATENT DOCUMENTS

EP     1 239 375     9/2002

(Continued)

OTHER PUBLICATIONS

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

(Continued)

*Primary Examiner*—Neveen Abel Jalil
*Assistant Examiner*—Kellye D Buckingham
(74) *Attorney, Agent, or Firm*—Fish & Richardson P.C.

(57) ABSTRACT

A computer program product that is tangibly embodied in an information carrier is described. The computer program product includes instructions that, when executed, perform operations for tracking data elements that are used in electronic documents. The method includes identifying an instance of a data element in a first electronic document comprising one or more data elements, modifying stored information based on the identification of the data element, periodically retrieving the stored information specifying a number of times a data element is used during a time interval, applying a calculation process to the information to determine a usage trend for the data element, and providing a visual display on a display device that shows an identifier for the data element and the usage trend.

22 Claims, 11 Drawing Sheets

U.S. PATENT DOCUMENTS

| | | |
|---|---|---|
| 6,125,391 A | 9/2000 | Meltzer et al. |
| 6,163,781 A | 12/2000 | Wess, Jr. |
| 6,226,674 B1 | 5/2001 | Klish |
| 6,226,675 B1 | 5/2001 | Meltzer et al. |
| 6,366,917 B1 | 4/2002 | St. John Herbert, III |
| 6,401,085 B1 | 6/2002 | Gershman et al. |
| 6,421,681 B1 | 7/2002 | Gartner et al. |
| 6,490,695 B1 | 12/2002 | Zagorski et al. |
| 6,535,919 B1 | 3/2003 | Inoue et al. |
| 6,542,912 B2 | 4/2003 | Meltzer et al. |
| 6,560,608 B1 | 5/2003 | Tomm et al. |
| 6,571,239 B1* | 5/2003 | Cole et al. ............... 707/5 |
| 6,591,260 B1 | 7/2003 | Schwarzhoff et al. |
| 6,606,462 B2* | 8/2003 | Siegel et al. ............. 399/24 |
| 6,611,726 B1* | 8/2003 | Crosswhite ............. 700/99 |
| 6,662,237 B1 | 12/2003 | Leckie |
| 6,694,338 B1 | 2/2004 | Lindsey |
| 6,757,739 B1 | 6/2004 | Tomm et al. |
| 6,785,538 B2 | 8/2004 | Nihei |
| 6,789,216 B2 | 9/2004 | Zagorski et al. |
| 6,799,174 B2* | 9/2004 | Chipman et al. .......... 707/3 |
| 6,801,201 B2* | 10/2004 | Escher ................ 705/36 R |
| 6,879,994 B1* | 4/2005 | Matsliach et al. ....... 709/204 |
| 6,910,182 B2* | 6/2005 | Huang ................. 715/239 |
| 6,938,044 B1* | 8/2005 | Milby ................. 707/100 |
| 6,941,511 B1 | 9/2005 | Hind et al. |
| 6,959,416 B2* | 10/2005 | Manning et al. ......... 715/513 |
| 6,985,905 B2 | 1/2006 | Prompt et al. |
| 7,028,312 B1 | 4/2006 | Merrick et al. |
| 7,058,645 B2 | 6/2006 | Seto et al. |
| 7,069,020 B2 | 6/2006 | Chung |
| 7,080,083 B2 | 7/2006 | Kim et al. |
| 7,127,516 B2 | 10/2006 | Inoue et al. |
| 7,136,467 B2 | 11/2006 | Brockman et al. |
| 7,146,399 B2 | 12/2006 | Fox et al. |
| 7,155,665 B1 | 12/2006 | Browne et al. |
| 7,181,463 B2 | 2/2007 | Moore et al. |
| 7,194,695 B1 | 3/2007 | Racine et al. |
| 7,197,506 B2* | 3/2007 | Wright ................. 707/102 |
| 7,225,203 B2 | 5/2007 | Kohno |
| 7,245,924 B2 | 7/2007 | Katagishi et al. |
| 7,246,128 B2 | 7/2007 | Jordahl |
| 7,275,079 B2 | 9/2007 | Brodsky et al. |
| 7,281,018 B1 | 10/2007 | Begun et al. |
| 7,313,756 B2 | 12/2007 | Panditharadhya et al. |
| 7,373,595 B2 | 5/2008 | Jones et al. |
| 7,421,395 B1 | 9/2008 | Link et al. |
| 2001/0034733 A1 | 10/2001 | Prompt et al. |
| 2002/0116389 A1 | 8/2002 | Chen et al. |
| 2002/0120506 A1 | 8/2002 | Hagen |
| 2002/0145944 A1 | 10/2002 | Wright |
| 2002/0147730 A1 | 10/2002 | Kohno |
| 2002/0147748 A1 | 10/2002 | Huang et al. |
| 2003/0028857 A1 | 2/2003 | Zagorski et al. |
| 2003/0083077 A1 | 5/2003 | Chung |
| 2003/0120665 A1 | 6/2003 | Fox et al. |
| 2003/0149934 A1 | 8/2003 | Worden |
| 2003/0200134 A1* | 10/2003 | Leonard et al. ............ 705/10 |
| 2003/0212904 A1 | 11/2003 | Randle et al. |
| 2004/0158567 A1 | 8/2004 | Dettinger et al. |
| 2004/0162871 A1 | 8/2004 | Pabla et al. |
| 2004/0177160 A1 | 9/2004 | Seto et al. |
| 2004/0203620 A1 | 10/2004 | Thome et al. |
| 2004/0205621 A1 | 10/2004 | Johnson et al. |
| 2005/0033719 A1 | 2/2005 | Tirpak et al. |
| 2005/0144277 A1 | 6/2005 | Flurry et al. |
| 2005/0166223 A1 | 7/2005 | Krasinski |
| 2005/0198068 A1 | 9/2005 | Mukherjee et al. |
| 2005/0198074 A1 | 9/2005 | Khayter et al. |
| 2005/0228803 A1 | 10/2005 | Farmer et al. |
| 2005/0240875 A1 | 10/2005 | Takayama et al. |
| 2005/0278372 A1 | 12/2005 | Shaburov et al. |
| 2006/0025987 A1 | 2/2006 | Baisley et al. |
| 2006/0085450 A1 | 4/2006 | Seubert et al. |
| 2006/0095288 A1 | 5/2006 | Amys et al. |
| 2006/0101068 A1 | 5/2006 | Stuhec |
| 2006/0106746 A1 | 5/2006 | Stuhec |
| 2006/0106824 A1 | 5/2006 | Stuhec |
| 2006/0136489 A1 | 6/2006 | Thome et al. |
| 2006/0178868 A1 | 8/2006 | Billerey-Mosier |
| 2006/0184539 A1 | 8/2006 | Blake et al. |
| 2006/0288006 A1* | 12/2006 | Eschbach et al. ............... 707/6 |
| 2007/0101391 A1 | 5/2007 | Hwang |
| 2007/0118354 A1 | 5/2007 | Stuhec |
| 2007/0150387 A1 | 6/2007 | Seubert et al. |

FOREIGN PATENT DOCUMENTS

| | | |
|---|---|---|
| EP | 1293850 | 3/2003 |
| EP | 1424643 | 6/2004 |
| EP | 1793288 | 6/2007 |
| WO | WO 98/40795 | 9/1998 |
| WO | WO 01/53967 | 7/2001 |
| WO | WO 01/55891 | 8/2001 |
| WO | WO 01/63477 | 8/2001 |

OTHER PUBLICATIONS

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases(VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhavan, Philip A. Bernstein, and Erhard Rahm, "Generic Schema Matching with Cupid," 2001, *Proceedings of the 27th VLDB Conference*, pp. 49-58.

Jayant Madhavan, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering(ICDE)*, pp. 1-12.

Lucian Popa, Yannis Velegrakis, Renee J. Miller, Mauricio A. Hernandez, Ronald Fagin, "Translating Web Data," 2002, *The Eleventh International WWW Conference*, pp. 1-12.

Hong Su, Harumi, Kuno, and Elke A. Rundensteiner, "Automating the Transformation of XML Documents," 2001, *The ACM Digital Library*, pp. 68-75.

A Complete Family of On-Demand SRM Solutions [online]. Perfect Commerce, 2005. Retrieved from the Internet <URL: www.web.archive.org/web/20060706034828/www.perfect.com/home/index/html>, 2 pages.

Adobe LiveCycle Designer FAQ; Adobe Systems Incorporated; document undated; 3 pages.

Ahmed et al.; "Verification of Data in Staging Schema, Mapping between Source Tables and Materialized Views"; 2005.

APACS—the UK Payments Association [online]. APACS, 2005. Retrieved from the Internet <URL: web.archive.org/web/20060711112524/http://www.apacs.org..uk>, 1 page.

Architecture of Integrated Information System [online]; Wikipedia; retrieved from the Internet <URL: http://en.wikipedia.org/wiki/Architecture_of_Integrated_Information_Systems>.

BI/Query Queries Guide; Hummingbird, Ltd. [online]; retrieved form the Internet <URL: http://www.notes.queensu.ca/uisadmin.nsf/579a5e3cc0e046c085256833007715cc/$FILE/queries_guide.pdf>; 6 pages.

Brown, P.; "Information Architecture with XML: A Management Strategy"; John Wiley & Sons; Hoboken; 2003.

Business Process Modeling Notation (BPMN) Information [online]; OMG/BPMN; retrieved from the Internet <URL: http://web.archive.org/web/20061011235521/http://www.bpmn.org>.

Celko, Joe; "Joe Celko's SQL for Smarties: Advanced SQL Programming"; 2nd Edition; 2000.

Chen et al.; "Managing Semantic Metadata for the Semantic Grid"; Proceedings of the Knowledge Grid and Grid Intelligence Workshop; Beijing, China; 2004; 9 pages.

CIDX—Open Standards that Open Markets [online]. CIDX, 2006. Retrieved from the Internet <URL: www.web.archive.org/web/20060708031302/http://www.cidx.org>, 2 pages.

Contivo VMS [online]; retrieved from the Internet <URL: http://www.contivo.com/contivovms.html>.

Core Components Technical Specification—Part 8 of the ebXML Framework [online]; UN/CEFACT; 2003; retrieved from the Internet <URL: http://www.unece.org/cefact/ebxml/CCTS_V2-01_Final.pdf>, 113 pages.

Core Components Technical Specification v2.01—Part 8 of the ebXML Framework; UN/CEFACT; Nov. 15, 2003; pp. 1-113.

Crawford, Mark (Lead Ed.); "Oasis Universal Business Language (UBL) Naming and Design Rules"; Nov. 15, 2004.

Davis, J.; "Context Tailor: Towards a Programming Model for Context-Aware Computing" International Middleware Conference Workshop Proceedings—Middleware for Pervasive and Ad Hoc Computing; Jun. 16-20, 2003; Rio de Janeiro, Brazil; pp. 68-75.

Decker, S. et al.; "ONTOBROKER: Ontology-based Access to a Distributed and Semi-Structured Information"; Kluwer Academic Publishers; 1998; pp. 1-20.

Designing Interfaces and Proxy Generation [online]; SAP; retrieved from the Internet <URL: http://help.sap.com/saphelp_nw2004s/helpdata/en/ba/d4c23b95c8466ce10000000a114084/>; 2 pages.

Do et al.; "COMA—A System for Flexible Combination of Schema Matching Approaches"; Proceedings of the 28th VLDB Conference; Hong Kong; 2002; 12 pages.

Driving Automated Integration Today [online]; Contivo; retrieved from the Internet <URL: http://web.archive.org/web/20061017222738/http://www.contivo.com/index/html>.

ebXML Business Process Specification Schema Version 1.01 [online]; Oasis; 2001; retrieved from the Internet <URL: http://www.ebxml.org/specs/ebBPSS.pdf>.

Embley et al.; "Automatic Direct and Indirect Schema Mapping: Experiences and Lessons Learned"; Dec. 2004.

Final Committee Draft ISO/IEC FCD—Information Technology—Metadata Registries (MDR)—Part 5—Naming and Identification Principles; ISO/IEC document dated Jan. 8, 2004; 26 pages.

FlexiSoft Solutions; retrieved from the Internet <URL: http://www.flexisoftsolutions.com/Products/SM2004/SM2004.aspx>; 4 pages.

Gefed Edifix; "Edifix Functions" [online]; Xenos; 2002; retrieved from the Internet <URL: http://www.gefeg.com/en/edifix/fx_functions.htm>.

GoXML Registry [online]; Xenos; 2002; retrieved from the Internet <URL: http://www.xmlglobabl.com/solutions/prod_goxml_registry.asp>.

Goyal; "An XML Schema Naming Assister for Elements and Types", National Institute of Standards and Technology; retrieved from the Internet <URL: http://www.mel.nist.gov/msidlibrary/doc/NISTIR7143.pdf>; 11 pages.

Gundry, Kathleen; SAIC, Namespaces and 11179; Jul. 26, 2002; 40 pages.

How to Solve the Business Standards Dilemma—CCTS Key Model Concepts; The SAP Developer Network; SAP AG, 2006; pp. 1-18.

How to Solve the Business Standards Dilemma—The Context Driven Business Exchange; The SAP Developer Network; SAG AG 2005; pp. 1-19.

InfoPath 2003 Product Overview; Microsoft Office Online; retrieved from the Internet <URL: http://www.microsoft.com/office/infopath/prodinfo/overview.mspx>.

Information Technology—Metadata Registries (MDR)—Part 2: Classifaction; International Standard ISO/IEC 11179-2; Nov. 15, 2005; 15 pages.

Information Technology—Metadata Registries (MDR)—Part 1: Framework; International Standard ISO/IEC 11179-1; Sep. 15, 2004; 31 pages.

Information Technology—Metadata Registries (MDR)—Part 3: Registry Metamodel and Basic Attributes; International Standard ISO/IEC 11179-3; Feb. 15, 2003; 107 pages.

Information Technology—Metadata Registries (MDR)—Part 4: Formulation of Data Definitions; International Standard ISO/IEC 11179-04; Jul. 15, 2004; 15 pages.

Information Technology—Metadata Registries (MDR)—Part 5: Naming and Identification Principles; International Standard ISO/IEC 11179-5; Sep. 1, 2005; 22 pages.

Information Technology—Metadata Registries (MDR)—Part 6: Registration; International Standard ISO/IEC 11179-6; Jan. 15, 2005; 69 pages.

Information Technology—Specification and Standardization of Data Elements—Part 5: Naming and Identification Principles for Data Elements; ISO/IEC document dated Dec. 1, 1995; 20 pages.

ISO/IEC 11179 International Standard-Information Technology: Specification and Standardization of Data Elements (Part 5: Naming and Identification Principles for Data Elements), First Edition, Dec. 1, 1995.

ISO/IEC 13250, Topic Maps, Information Technology, Document Description and Processing Languages; Dec. 3, 1999; 47 pages.

Jurgensen, T.; "Report on Contivo Product Workshop made by Contivo, C.A.S. and SAPMarkets"; SAP Markets, Product Workshop on Contivo; St. Leon Rot; Aug. 1-2, 2001; 5 pages.

Kesseler; "A Schema Based Approach to HTML Authoring"; Aug. 2000; pp. 1-17.

Kifer, M. et al.; "Logical Foundations of Object-Oriented and Frame-Based Languages"; J. Assoc Computing Machinery; May 1995; pp. 1-100.

Kifer, M.; "F-Logic: A Higher-Order Language for Reasoning about Objects, Inheritance, and Scheme"; Jun. 3, 1997; pp. 1-21.

Know How to Use Know-How [online]. Ontoprise, 2006. Retrieved from the Internet <URL: http://web.archive.org /web/20060208064330/wvvw.ontoprise.de/content/index_eng.html>.

Message Type [online]; SAP; retrieved from the Internet <URL: http://help.sap.com.saphelp_nw2004s/helpdata/en/2d/c0633c3a892251e10000000a114084>; 2 pages.

Oasis ebXML Registry TC [online]; Oasis; 2005; retrieved from the Internet <URL: http://www.oasis-open.org/committees/tc_home.php?wg_abbrev=regrep>.

Oasis Universal Business Language (UBL) TC [online]. Oasis. Retrieved from the Internet <URL: www.oasis-open.org/committees/tc_home/php?wg_abbrev=ubl>, 7 pages.

Office Action issued in U.S. Appl. No. 11/063,000 on Oct. 9, 2008; 16 pages.

Office Action issued in U.S. Appl. No. 10/990,898 on Apr. 17, 2008; 10 pages.

Office Action issued in U.S. Appl. No. 10/990,898 on Jun. 14, 2007; 11 pages.

Office Action issued in U.S. Appl. No. 10/990,898 on May 8, 2009; 12 pages.

Office Action issued in U.S. Appl. No. 10/990,898 on Nov. 27, 2007; 11 pages.

Office Action issued in U.S. Appl. No. 10/990,898 on Oct. 24, 2008; 12 pages.

Office Action issued in U.S. Appl. No. 11/063,000 on Apr. 17, 2009; 18 pages.

Office Action issued in U.S. Appl. No. 11/087,918 on Aug. 14, 2008; 20 pages.

Office Action issued in U.S. Appl. No. 11/087,918 on Jan. 28, 2008; 22 pages.

Office Action issued in U.S. Appl. No. 11/087,918 on Jul. 10, 2007; 18 pages.

Office Action issued in U.S. Appl. No. 11/087,918 on Jun. 9, 2009; 27 pages.

Office Action issued in U.S. Appl. No. 11/087,918 on Oct. 28, 2008; 25 pages.

Office Action issued in U.S. Appl. No. 11/088,158 on Jan. 25, 2008; 19 pages.

Office Action issued in U.S. Appl. No. 11/088,158 on Jul. 1, 2008; 18 pages.
Office Action issued in U.S. Appl. No. 11/088,158 on Jul. 18, 2007; 13 pages.
Office Action issued in U.S. Appl. No. 11/088,158 on Nov. 25, 2008; 21 pages.
Office Action issued in U.S. Appl. No. 11/285,368 on Apr. 4, 2008; 17 pages.
Office Action issued in U.S. Appl. No. 11/285,368 on Dec. 1, 2008; 17 pages.
Office Action issued in U.S. Appl. No. 11/285,368 on Jun. 3, 2009; 17 pages.
Office Action issued in U.S. Appl. No. 11/285,368 on Nov. 9, 2007; 12 pages.
Office Action issued in U.S. Appl. No. 11/286,762 on Dec. 11, 2008; 28 pages.
Office Action issued in U.S. Appl. No. 11/286,762 on Jun. 23, 2008; 24 pages.
Office Action issued in U.S. Appl. No. 11/286,762 on Dec. 11, 2007; 22 pages.
Office Action issued in U.S. Appl. No. 11/291,327 on Apr. 17, 2008; 16 pages.
Office Action issued in U.S. Appl. No. 11/291,327 on Mar. 6, 2009; 14 pages.
Office Action issued in U.S. Appl. No. 11/291,327 on Nov. 14, 2007; 7 pages.
Office Action issued in U.S. Appl. No. 11/291,327 on Oct. 2, 2008; 20 pages.
Office Action issued in U.S. Appl. No. 11/400,837 on Apr. 21, 2009; 12 pages.
Office Action issued in U.S. Appl. No. 11/400,837 on Nov. 14, 2008; 13 pages.
Office Action issued in U.S. Appl. No. 11/618,529 on Dec. 8, 2008; 9 pages.
Office Action issued in U.S. Appl. No. 11/618,529 on Jun. 3, 2009; 8 pages.
OntoBroker—The Power of Inferencing [online]. Ontoprise, 2005. Retrieved from the Internet <URL: http://web.archive.org/web/20051122071757/www.ontoprise.de/content/e3/e27/index_eng>.
OntoMap Light-Weigth Ontology Management Platform [online]; Sirma, 1993-2005; retrieved from the Internet <URL: http://www.ontotext.com/projects/ontomap.html>.
Open Applications Group: Standards for Business Software Interoperability [online]. OAGi. Retrieved from the Internet <URL: www.web.archive.org/web/20060616190904/http:openapplications.org>, 3 pages.
Peng, J. et al.; "A Reference Data Model for NEESgrid Shake Table Experiments"; Proceedings of the International Symposium on Earthquake Engineering in the Past and Future Fifty Years; 2004; 10 pages.
Project: ebXML Registry/Repository: Summary [online]; SourceForge.net, 2005; retrieved from the Internet <URL: http://sourceforge.net/projects/ebsmlrr>.
RosettaNet Standards [online]. Rosettanet, 1998-2007. Retrieve from the Internet: <URL: www.portal.rosettanet.org/cms/sites/RosettaNet/Standards/RStandards/index.html>, 2 pages.
SAP Exchange Infrastructure; SAP; retrieved from the Internet <URL: http://help.sap.com/saphelp_erp2004/helpdata/en/0f/80243b4a66ae0ce10000000a11402f/c ... >.
Searle, John R.; "Chomsky's Revolution in Linguistics"; The New York Review of Books; Jun. 29, 1972.
Search Report issued in European Application No. 06023849.0 on Mar. 22, 2007; 7 pages.
Search Report issued in European Application No. 06023585.0 on Feb. 22, 2007; 7 pages.
Search Report issued in European Application No. 06022546.3 on Mar. 15, 2007; 6 pages.
Search Report issued in European Application No. 06022715.4 on Jan. 22, 2007; 8 pages.
Schuldt, Ron; "Universal Data Element Framework (UDEF) Overview"; Open Group; San Francisco, CA; Jan. 24-28, 2005; 32 pages.
Stuhec, G. and Crawford, M.; "How to Solve the Business Standards Dilemma—The CCTS Standards Stack"; SAP AG, 2006; pp. 1-13.
Stuhec, G.; "How to Solve the Business Standards Dilemma—The CCTS Based Core Data Types"; SAP AG, 2006; pp. 1-22.
Tao et al.; "Applying the Semantic Web to Manage Knowledge on the Grid"; E-Science AHM; Nottingham, England; 2004; 8 pages.
Tao et al.; "Semantic Web Based Content Enrichment and Knowledge Reuse in E-Science"; On the Move to Meaningful Internet Systems 2004: CoopIS, DOA, and ODBASE; 2004; 14:654-699.
The Company of the Open Standard Solutions [online]; ehXMLsoft, Inc.; 2001-2004; retrieved from the Internet <URL: http://www.ebsmlsoft.com>.
UN/CEFACT, ebXML Core Components Technical Specification, Version 1.85; Sep. 30, 2002; 118 pages.
UN/CEFACT, ehXML Requirements Specification, Version 1.06, ebXML Requirements Team; May 8, 2001; 43 pages.
UN/CEFACT, ebXML Technical Architecture Specification v1.0.4, ebXML Technical Architecture Project Team; Feb. 16, 2001; 39 pages.
UN/CEFACT's Modeling Methodology (UMM) in a Nutshell; undated manuscript, believed to have been published Nov. 15, 2006; retrieved from the Internet <URL: http://www.untmg.org/index.php?option=com_docman@task=docclick&Itemid=137&bid=55&limitstart=0&limit=5>.
UN/CEFACT's Modeling Methodology (UMM): UMM Meta Model—Foundation Module Version 1.0 Technical Specification [online]; CEFACT Oct. 6, 2006; retrieved from the Internet <URL: http://www.unece.org/cefact/umm/UMM_Foundation_Module.pdf>.
Universal Data Element Framwork (UDEF) [online]; Oasis; May 23, 2005; retrieved from the Internet <URL: http://xml.coverpages.org/udef.html>.
xCBL 4.0 Final Release Now Available [online]. xCBL, 2000 Retrieved from the Internet: <URL: www.web.archive.org/web/20060619154652/http://www.xcbl.org>, 3 pages.
XForms—The Next Generation of Web Forms; W3C; Retrieved from the Internet <URL: http://www.w3.org/MarkUp/Forms>; 11 pages.
XForms 1.1,; W3C Working Draft Nov. 15 2004; retrieved from the Internet <URL: http://www.w3.org.TR/2004/WD-xforms11-20041115>; 26 pages.
XML Path Language (XPath) Version 1.0; W3C Recommendation; Nov. 16, 1999; W3C; retrieved from the Internet <URL: http://www.w3.org/TR/xpath>; 37 pages.
XML Schema; W3C; retrieved from the Internet <URL: http://www.w3.org/XML/Schema>; 16 pages.
XML Schema, Part 2: Datatypes Second Edition [online]; W3C; 2004; retrieved from the Internet , <URL: http://www.w3.org/TR/2004/REC-xmlschema-2-20041028>; 194 pages.
Trade secret material not open to public. To be opened only by examiner or other authorized U.S. Patent and Trademark Office Employee (filed by Express Mail in the present Application on Jun. 2, 2010).
Office Action issued in U.S. Appl. No. 10/986,628 on May 17, 2007; 19 pages.
Office Action issued in U.S. Appl. No. 10/986,628 on Nov. 6, 2007; 18 pages.
Office Action issued in U.S. Appl. No. 10/986,628 on Apr. 24, 2008; 21 pages.
Office Action issued in U.S. Appl. No. 10/986,628 on Aug. 15, 2008; 32 pages.
Office Action issued in U.S. Appl. No. 10/986,628 on Jan. 9, 2009; 30 pages.

* cited by examiner

```
<xsd:complexType name="PeriodType" id="UN00000116"/>                                    300
  <xsd:sequence>                                                        305
    <xsd:element name="DurationDateTime" id="UN00000117" minOccurs="0" maxOccurs="unbounded">
      <xsd:annotation>
        <xsd:appinfo>                                          310    325
          <FrequencyOfUsage>
            <CounterValue>1323</CounterValue>                                     330
            <LastUsageDate>2004-05-05</LastUsageDate>                              335
            <UsedInMessages><MessageName>PurchaseOrder</MessageName></UsedInMessages>
            <CountingDuration>P1M</CountingDuration>                      340
            <CountingMinValue>100</CountingMinValue>                  345
          </FrequencyOfUsage>
        </xsd:appinfo>
        <xsd:appinfo source="urn:xyz:statistics"/>
      </xsd:annotation>
      <xsd:complexType>
        <xsd:simpleContent>
          <xsd:extension base="qdt:DurationDateTimeType"/>
        </xsd:simpleContent>
      </xsd:complexType>                   315
    </xsd:element>
    <xsd:element name="Indicator" id="UN00000118" minOccurs="0" maxOccurs="unbounded">
      <xsd:annotation>
        <xsd:appinfo>                                         325
          <FrequencyOfUsage>
            <CounterValue>1323322</CounterValue>                              330
            <LastUsageDate>2004-06-03</LastUsageDate>                         335
            <UsedInMessages><MessageName>PurchaseOrder</MessageName></UsedInMessages>
          </FrequencyOfUsage>
        </xsd:appinfo>
      </xsd:annotation>
      <xsd:complexType>
        <xsd:simpleContent>
          <xsd:extension base="udt:IndicatorType"/>
        </xsd:simpleContent>
      </xsd:complexType>
    </xsd:element>
```

FIG. 3

TRACKING USAGE OF DATA ELEMENTS IN ELECTRONIC BUSINESS COMMUNICATIONS

CROSS REFERENCE TO RELATED APPLICATION

This is a continuation-in-part of application Ser. No. 10/986,628, filed Nov. 12, 2004, and is incorporated by reference in its entirety.

BACKGROUND

Companies have conventionally exchanged electronic business information using Electronic Data Interchange (EDI). EDI is a set of protocols that enable the transfer of data between different companies using networks, such as the Internet. Both the United Nations Joint European and North American working party (UN-JEDI) and the American National Standards Institute (ANSI) have developed standards that outline EDI. While EDI has allowed companies to communicate more efficiently than through the use of traditional paper-based communications, smaller companies face challenges to participate in electronic business (or electronic collaboration). These companies need to invest in complex and expensive computer systems to be installed at local computers, or to register with marketplaces at remote computers accessible through the Internet. In either case, the companies are bound by the particulars of the local or remote computer systems. Changes lead to further costs for software, hardware, user training, registration, and the like.

More recently, the development of the Extensible Markup Language (XML) has offered an alternative way to define formats for exchanging business data. XML provides a syntax that can be used to enable more open and flexible applications for conducting electronic business transactions, but does not provide standardized semantics for messages used in business processes. Initiatives to define standardized frameworks for using XML to exchange electronic business data have produced specifications such as the Electronic Business Extensible Markup Language (ebXML) Core Components Technical Specification (CCTS) and ISO 11179, which is incorporated in ebXML CCTS. Despite the efforts of such initiatives to develop a single standard for conducting electronic business, a number of competing XML and non-XML-based standards and proprietary formatting schema have been developed and are in common use, including cXML, ebXML, SAP IDoc, SAP IFR XML, OAG BOD, ANSI X12, EDI-FACT, SWIFT, FIX, RosettaNet, and xCBL. In addition, some companies continue to use EDI-based systems based at least in part on their substantial investments in EDI integration. In one way, however, EDI is compatible with the XML standards because existing EDI data format may be easily translated to and from XML. The large number of available schemas complicates efforts to conduct electronic business because a company will often adopt a particular schema that is not supported by all of the company's trading partners.

Further complicating matters is the fact that many of the schema are constantly evolving (i.e., new business data elements are regularly added). Currently, human modelers sometimes use intuition to create schemas and business data elements that the modelers believe businesses will use in transactions without actually knowing exactly which data elements will be needed. Some of these created data element definitions are not used in business transactions for some reason. Modelers are, however, reluctant to remove the definitions from a schema repository without a reliable indication that the data element is not needed. Therefore, the schema repository may store many unneeded data elements and modelers may not construct schemas in an efficient manner.

SUMMARY

The present application describes methods and apparatus, including computer program products, that implement techniques for tracking usage of business data elements from one or more communication schemas used for transacting electronic business.

In one general aspect, a computer program product that is tangibly embodied in an information carrier is described. The computer program product includes instructions that, when executed, perform operations for tracking data elements that are used in electronic documents. The method includes identifying an instance of a data element in a first electronic document comprising one or more data elements, modifying stored information based on the identification of the data element, periodically retrieving the stored information specifying a number of times a data element is used during a time interval, applying a calculation process to the information to determine a usage trend for the data element, and providing a visual display on a display device that shows an identifier for the data element and the usage trend.

In one implementation, the operations may further include using the usage trend to map the data element in the first electronic document to a data element in an intermediate document. Additionally, the operations may also include mapping the data element in the intermediate document to a data element in a second electronic document.

The stored information may be stored in a schema comprising a definition associated with the data element, and the operations may further include deleting or modifying the definition based the usage trend for the data element. Additionally, the operations may further include generating a recommendation to delete or modify the definition based on the usage trend for the data element, and the operations may also include receiving a revised definition for the schema. The periodic retrieval may include aggregating the retrieved stored information with previously retrieved stored information specifying a number of times the data element was used during a previous time interval, and the periodic retrieval may further include resetting the stored information.

In another implementation, the calculation process includes ordering the information according to a time series model. The time series model may include a component selected from a group consisting of a smooth trend component, a cyclic trend component, a seasonal trend component, and an irregular trend component. The displayed usage trend may comprise one component. Additionally, the calculation process may further include applying a statistical smoothing procedure to the time series model. The smoothing procedure may include a linear regression calculation, an exponential smoothing calculation, or both. Also, the statistical smoothing procedure may generate an estimate for a future trend usage.

In yet another implementation, the usage trend for the data element may be displayed as a single symbol. The usage trend may vary graphically based on a value of the usage trend. A selection of the symbol may display a usage trend graph. Additionally, the usage trend may indicate that the data element may be deleted because the element has not been used for a determined amount of time.

In another general aspect, another computer program product that is tangibly embodied in an information carrier is described. The computer program product includes instructions that, when executed, perform a method for tracking usage data for a data element. The method includes creating a schema having definitions associated with data elements, periodically retrieving stored information specifying a number of times each data element is used during a time interval, applying a calculation process to the information to determine a usage trend for each data element, providing a visual display on a display device that shows an identifier for a data element and a usage trend associated with the data element, and receiving a revised schema definition.

In yet another general aspect, a computer program product, tangibly embodied in an information carrier is described, where the computer program product is operable to cause data processing apparatus to receive an electronic document comprising instances of business data elements. The electronic document has a format corresponding to a business communication schema, where the business communication schema includes a set of predefined business data elements for use in transacting electronic business. The computer program product is also operable to cause the processing apparatus to identify an instance of a particular business data element in the electronic document, and increment a counter associated with the particular business data element in response to identifying an instance of the particular business data element.

The embodiments can be implemented to realize one or more of the following advantages. Statistics and data on the actual usage of business data elements can be automatically collected during the exchange of electronic business documents. These statistics and data can be used to assist in automatic or semi-automatic mapping of business data elements between different business data schemas. In some circumstances it may be unclear whether to map a data element from a first schema to a first data element or to a second data element in a second schema. The statistics can be used to establish a preference within the mapping procedure for the more frequently used business data elements. For example, in some implementations, a data element may be mapped from a first schema to an intermediate schema, and then to a second schema. The established preference may guide the system in determining which intermediate data element should be selected for mapping, which in turn, guides the system in determining which secondary data element should be selected for mapping. For example, the most frequently used business data element from a set of similar elements can be automatically selected unless certain conditions for using another business data element are met.

In one implementation, the system performs the semi-automatic or automatic mapping when translating a source schema into an intermediate schema, such as a CCTS schema. In another implementation, the system performs the semi-automatic or automatic mapping when translating the source schema directly into a destination schema.

The statistics may also be used in evolutionary data modeling, which includes alerting a user managing the software model that certain data elements may be deleted because the elements have not been used during a defined time period. For example, if the system detects that the data element "LastName" is used frequently during the last year, but the data element "Surname" has not been detected during that periods, the system may recommend that the user delete the data element "Surname" from the schema, while leaving the data element "LastName" unchanged. Additionally, evolutionary data modeling may include alerting a user that one or more data elements may be merged or should remain unchanged.

By establishing preferences, the statistics and data can also help avoid the use of incorrect business data elements during mapping (e.g., elements that do not correctly represent the semantic meaning of the underlying data). The statistics and data can be used to identify business data elements that are not used or that are used infrequently. A schema that includes business data elements can be modified to selectively delete unused or infrequently used business data elements. Such deletions allow the schema to evolve toward a more streamlined set of elements, which can increase the efficiency of both mapping between different schemas and generating electronic documents based on the schema by removing the need to consider business data elements that have become obsolete as a result of evolving business requirements. CCTS-based schemas can be evolved to follow business requirements by extending the schemas to include new elements and restricting the schemas by removing unused elements. A selectively streamlined schema can also help avoid potential semantic misunderstandings resulting from the use of obsolete business data elements. The statistics can be used in semi-automatic modeling. Semi-automatic modeling provides and recommends only the more-frequently used business data elements and/or business data elements with a positive usage trend, among business data elements that are semantically similar. For example, a modeler writes a definition in a specific context for his required additional business information. The semi-automatic modeling approach searches for same or similar business data elements in the library that are appropriate for the defined requirements. If the system finds more than one similar business data elements in the repository, additional information about the frequency of usage of each business data element can be used to select an appropriate business data element.

The statistics can also be used for modeling and optimization of new data models (e.g., if a complete new business document is required). Preferences for the more used business data elements and/or business data elements with a positive usage trend for use in the new data model can define a more efficient data model. Implementations provide one or more of the above advantages. Modelers may track usage trends for each data element and delete elements that are not used. Additionally, some elements may have usage trends that indicate they should be merged. Tracking, analyzing, and displaying the used trends for business data elements enables modelers to make informed decisions regarding which data elements should be modified or deleted and how schemas may be efficiently constructed.

Details of one or more implementations are set forth in the accompanying drawings and in the description below. Further features, aspects, and advantages of the implementations will become apparent from the description, the drawings, and the claims.

BRIEF DESCRIPTION OF THE DRAWINGS

FIG. 3 is an excerpt from a sample XML definition of a communication schema.

Like reference numbers and designations in the various drawings indicate like elements.

DETAILED DESCRIPTION

Figure 1:
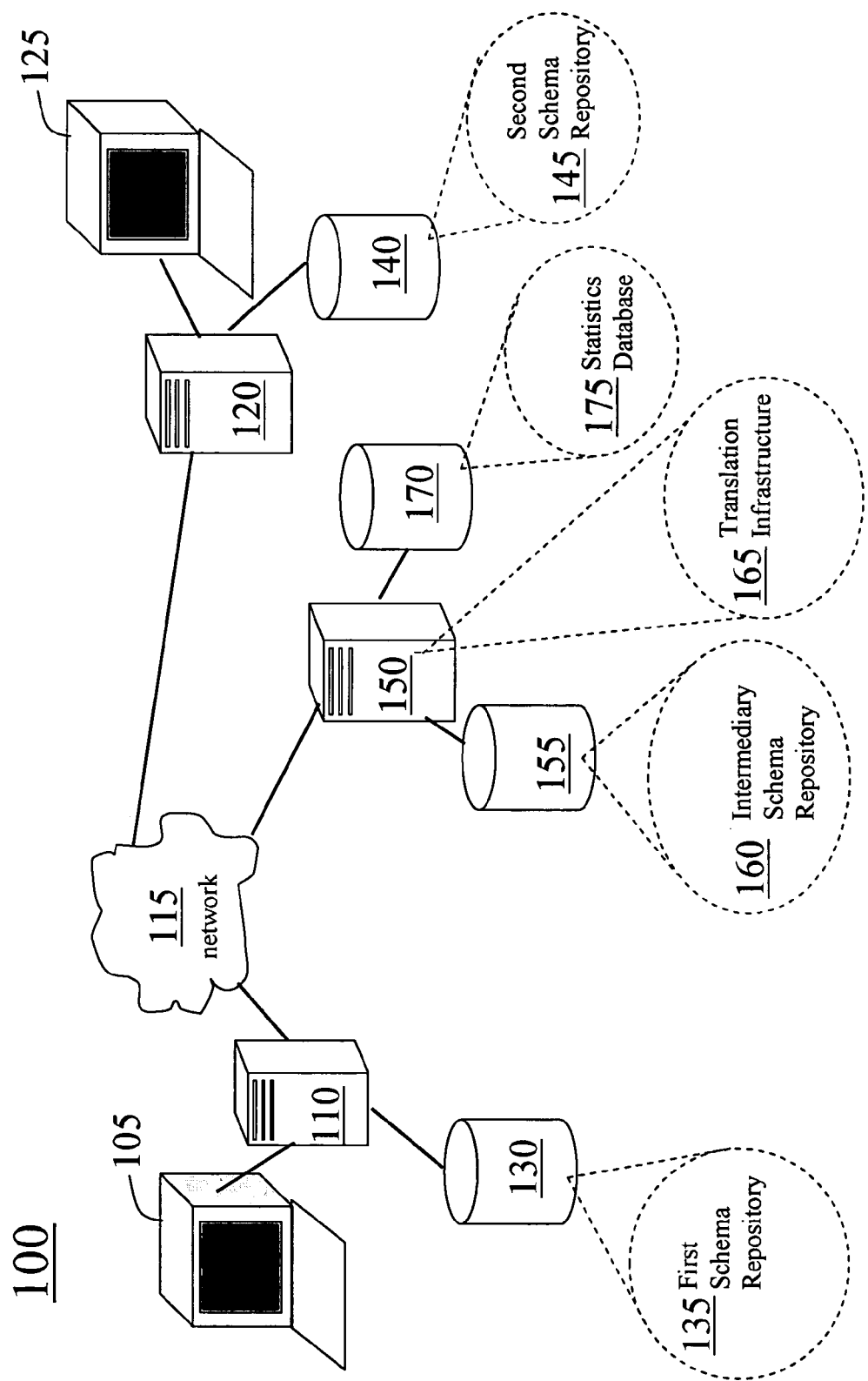
FIG. 1 is a block diagram of a system for transacting electronic business using one or more business communication schemas.

In general, electronic business communications can be conducted using electronic documents. An electronic document does not necessarily correspond to a file. A document may be stored in a portion of a file that holds other documents, in a single file dedicated to the document in question, or in multiple coordinated files. An electronic document used in transacting electronic business is formatted in accordance with one of a wide variety of available business communication schemas (e.g., EDIFACT, X12, xCBL, a CCTS-based schema, or IDoc). An electronic document can correspond to an electronic business message, transaction, group of related messages, or group of related transactions.

Each business communication schema includes a set of business data elements from which electronic documents can be constructed. For example, a purchase order electronic document can be constructed using an aggregation of business data elements that specify the buyer and the seller, identify the document as a purchase order, list the ordered products, specify delivery terms, and provide other relevant information. A communication schema can be defined using XML.

Business data elements for a communication schema are used to represent object classes (e.g., a person or an address), characteristics of an object class (e.g., a postal code), a business context (e.g., chemical industry), a data type (e.g., valid values for a characteristic), associations (e.g., between a person and an address), representation classes, messages, transactions, and the like. Each business data element in an electronic business framework typically includes a unique name. The unique name identifies the element and/or to indicate what is represented by values or sub-elements within the element. In some communication schemas, elements are defined by code names. For example, xCBL uses a numerical code to identify a data type for each instance of a business data element. Other communication schemas define elements using semantic names, which can include multiple concatenated terms that describe characteristics of the component. For example, ISO 11179, which is incorporated in CCTS, defines a naming convention in which each data element is described by a name that semantically describes the business data element ("address.street" or "party.company") and how it is represented (e.g., text or code).

A typical business communication schema will enable a large number of different transactions and/or messages using a large set of business data elements. Some of the business data elements are shared among multiple different transaction and/or message types while other business data elements may be associated with a particular transaction and/or message type. Business data elements in an electronic document are organized according to a format for the business communication schema, which can include a format that is common between different transaction and/or message types, and/or formatting characteristics that are specific to each transaction and/or message type.

FIG. 1 is a block diagram of a system 100 for transacting electronic business using one or more business communication schemas. The system 100 includes a first monitor 105 connected to a first computer 110 and a second monitor 125 connected to a second computer 120. Electronic business communications between the first computer 110 and the second computer 120 are conducted over a network 115, such as the Internet, in accordance with a business communication schema. To facilitate electronic business communications, the first computer 110 includes a data storage device 130 containing a first schema repository 135 and the second computer 120 includes a data storage device 140 containing a second schema repository 145. Each of the first schema repository 135 and the second schema repository 145 store metadata describing one or more formats defined by a business communication schema.

The monitor 105 displays user interfaces for allowing a user to enter or otherwise define business data to be included in an electronic document. The first computer 110 generates the electronic document in accordance with the metadata stored in the first schema repository 135. In particular, the first computer 110 organizes the data entered by the user according to a communications schema format defined in the first schema repository 135. The generated electronic document can then be transmitted over the network 115 to a receiving entity, such as the second computer 120. The second computer 120 is capable of interpreting received electronic documents in accordance with the metadata stored in the second schema repository 145. In particular, the second computer 120 interprets data contained in a received electronic document according to a communications schema format defined in the second schema repository 145.

One or more communications schemas can be defined in each schema repository 135 and 145. In some cases, two enterprises that wish to transact electronic business agree to use a particular communication schema that both enterprises support. In other words, the same communication schema is defined in both the first schema repository 135 and the second schema repository 145. In such a case, an electronic document generated by the first computer 110 using the particular communication schema can be interpreted by the second computer 120 using the metadata in the second schema repository 145, and the monitor 125 can display user interfaces that include the data contained in the electronic document.

In other situations, two enterprises that wish to transact electronic business use communication schemas that are incompatible with one another. For example, a first communication schema is defined in the first schema repository 135, and a different communication schema is defined in the second schema repository 145. If an electronic document is generated by the first computer 110 and sent directly to the second computer 120, the second computer 120 is unable to interpret the electronic document because the second schema repository 145 does not include information for mapping business data elements between different schemas.

To exchange an electronic document between computers 110 and 120 that support different communication schemas, it is possible to translate the electronic document from the first communication schema format to the second communication schema format using a translation infrastructure 165 in an intermediary computer 150. The intermediary computer 150 includes a storage device 155 containing an intermediary schema repository 160. The intermediary schema repository 160 includes metadata defining both the first and second communication schemas. To communicate with the second computer 120, the first computer 110 sends an electronic document generated using the first communication schema to the translation infrastructure 165. The translation infrastructure 165 translates the electronic document from the first communication schema format to the second communication schema format, including translating the business data elements, using the metadata stored in the intermediary schema repository 160. The translated electronic document is sent to the second computer 120, which interprets the included data using the second communication schema metadata stored in the second schema repository 145.

In some implementations, the translation infrastructure 165 translates electronic documents from the first communication schema format directly to the second communication schema format. In other implementations, the translation infrastructure 165 translates electronic documents from the first communication schema format to an intermediary communication schema format and then from the intermediary communication schema format to the second communication schema format. The intermediary communication schema format is based on the UN/CEFACT XML Naming and Design Rules for UN/CEFACT CCTS. The translation infrastructure 165 can generally translate between any number of different communication schema formats using metadata describing the various different communication schema formats stored in the intermediary schema repository 160. Metadata defining a library of business data elements can also include data necessary for mapping the business data elements to other formats. The translation infrastructure 165 can be, for example, the Exchange Infrastructure (XI), available from SAP AG of Walldorf (Baden), Germany.

In addition to translating electronic documents, the translation infrastructure 165 also collects statistics and other information relating to electronic documents that pass through the intermediary computer 150. For example, the translation infrastructure 165 counts instances of business data elements that are included in electronic documents. A counter corresponding to each business data element in a communication schema is incremented when the translation infrastructure 165 identifies an instance of the business data element. In some implementations, the counter is incremented for each separate instance of the business data element in an electronic document. Alternatively, the counter is incremented only once for each electronic document that includes the business data element regardless of how many instances are included in the electronic document.

Additional data that can be collected includes a name or other identifier for each message or transaction that includes one or more instances of the business data element and/or a date or time that the electronic document is sent, received, or translated. The additional data can also include statistics used to identify usage trends (e.g., increasing, decreasing, and cyclical usage trends) by storing counter values and other data for multiple different time periods.

The value of the various counters and the additional data collected is stored in a statistics database 175 contained in a storage device 170 for the intermediary computer 150. The statistics database 175 can also be stored in the storage device 155 that contains the intermediary schema repository 160 or even as part of the metadata defining the communication schema that is stored in the storage device 155 (e.g., the counter and other data for each business data element can be stored as additional attributes of the complex Type element definition as illustrated in FIG. 3). The counter values and the other data can be used to determine which business data elements should be favored in mapping procedures, which business data elements can be deleted, which business data elements are used only with specific messages or transactions, how to model new schema (e.g., an intermediary format), and how to optimize existing schema. Additionally, the statistics database 175 may include information used to determine usage trends for data elements.

Figure 6:
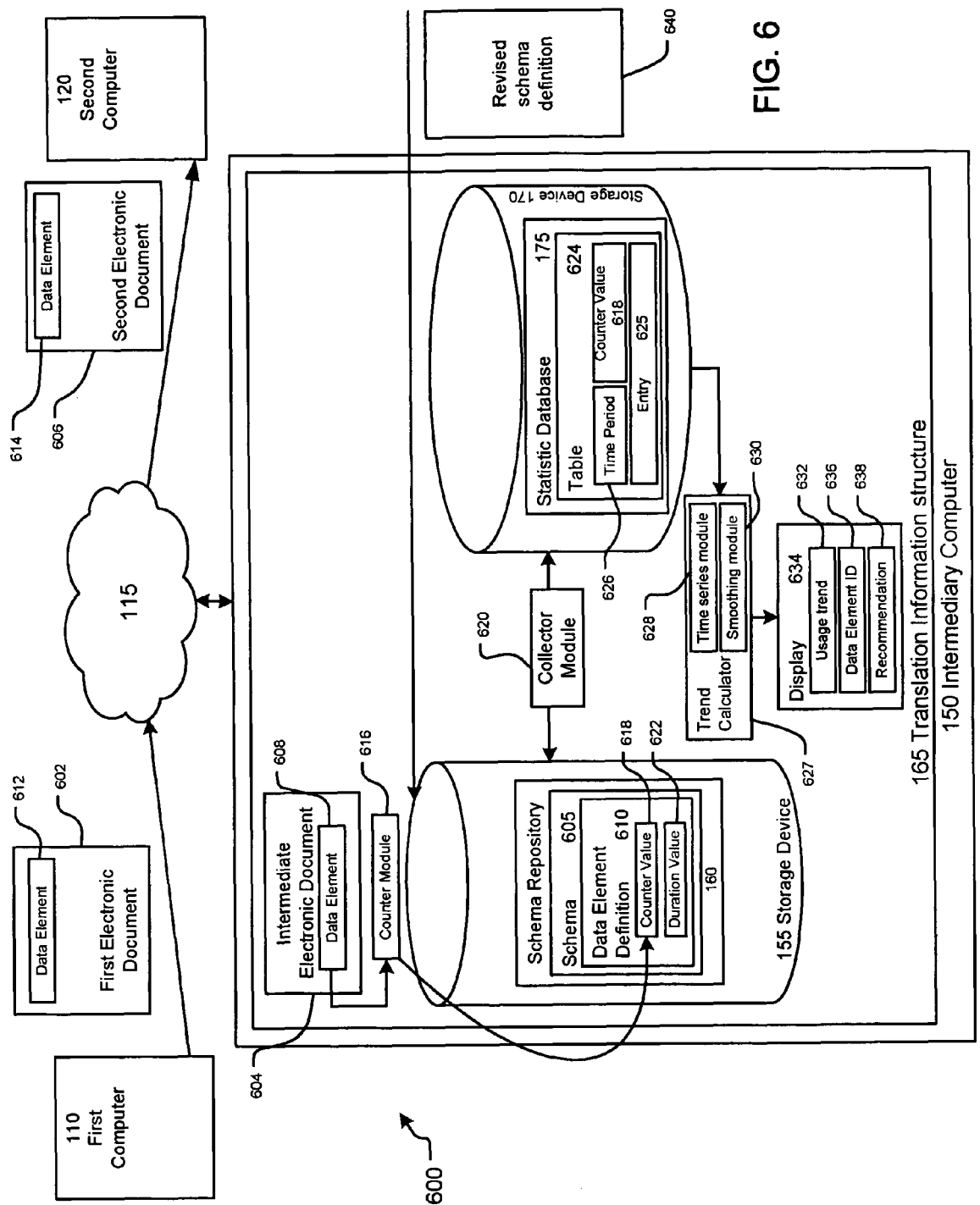
FIG. 6 is a block diagram of a system for generating usage trends for data elements according to one implementation.

FIG. 6 is a block diagram of a system 600 for generating usage trends for data elements according to one implementation discussed above. The system 600 includes the first computer 110, the intermediate computer 150, and the second computer 120. The first computer 110 transmits a first electronic document 602, which is created according to a schema from the first schema repository 135, to the intermediate computer 150 through the network 115. The translation information structure 165 implemented at the intermediary computer 150 receives the first electronic document 602 and translates it into an intermediate electronic document 604 using a schema 605 from the schema repository 160 located in the storage device 155. The translation information structure 165 may then translate the intermediate document 604 into a second electronic document 606 and transmit it to the second computer 120.

The electronic documents include one or more data elements. Each data element may be defined by the schema used to create the document. Each schema may have a set of data element definitions that correspond to instantiated data elements. For example, the data element 608 in the intermediate electronic document 604 is defined by the data element definition 610, which will be discussed in greater detail in association with FIG. 8. Similarly, the data element 612 in the first electronic document 602 and the data element 614 in the second electronic document 606 may be defined by schemas in the first and second schema repositories 135, 145, respectively.

When the translation information structure 165 receives the intermediate document 604, the structure may parse the document to determine if the data element 608 is present. If the data element exists, a counter module 616 accesses the corresponding data element definition 610 and modifies a counter value 618. For example, the counter module 616 may increment the counter value 618 every time the data element 608 is detected in an electronic document.

After a predetermined period of time, a collector module 620 accesses the data element definition and retrieves the counter value 618. The predetermined period of time may be specified by a duration value 622 stored in the data element definition 610. For example, the collector module may retrieve the duration value 622 at the same time the counter value 618 is retrieved. The collector module 620 uses the retrieved duration value to determine when to access the data element definition 610 to retrieve an updated counter value. In some implementations, the collector module 620 resets the counter value stored in the data element definition 610 to zero. The counter value is then incremented by the counter module 616 until the collector module 620 retrieves and resets it again. In this way, every retrieved counter value represents the number of times a data element is detected by the translation information structure 165 during the period of time defined by the duration value 622.

The retrieved counter values may be stored in the statistic database 175 implemented at the storage device 170. For example, the database 175 may include a table 624, which contains an entry comprising the retrieved counter value 618 and a time period 626 associated with counter value. In some implementations, the time period 626 may be the day, time, and year the collector module 620 retrieved the counter value 618.

In the implementation shown in FIG. 6, the trend calculator 627 accesses the entries in the database table 624 and uses a time series module 628 to order the retrieved counter values and associated time periods into a time series for the corresponding data elements. The calculator 628 may also use a smoothing module 630 to generate estimates of future trends, eliminate trend irregularities, and isolate trend components. The trend calculator 627 also generates a usage trend 632 that is transmitted to the display 634. The trend calculator 627 and its sub-modules are discussed in greater detail in association with FIGS. 9, 12, and 13.

The display 634 shows a user the usage trend 632 for a particular data element 608, which is specified by a data element ID 636. For example, the data element may be a field specified by the data element ID "last name." The usage trend 632 may be displayed beside the text "last name." In some implementations, the usage trend may be an arrow which points in a direction, which indicates how often the corresponding data element has been used over a period of time. The display may also show a recommendation 638 for the data element corresponding to the usage trend 632. The recommendation 638 may be a message suggesting the user delete the data element because the usage trend indicates the element has not been used for a long period of time. Additionally the recommendation 638 may be a suggestion to merge the data element with another data element or to modify the data element.

The trend calculator may transmit the usage trend 632 and the recommendation 638 to the display. In some implementations, the data element ID 636 may be retrieved by the collector module 620 from the data element definition 610 and stored in association with the table 624 in the statistic database 170. The trend calculator 627 may transmit the data element ID 636 to the display 634.

In the implementation of FIG. 6, the translation information structure may receive a revised schema definition 640. For example, a user may view the recommendation 638 on the display 634. The recommendation 638 may suggest that the user delete the data element "Surname" because the usage trend indicates it has not been used in the last two years. Using an input device for the intermediary computer 150, the user may revise the schema definition by deleting the "Surname" data element. This revised schema definition may be stored in the schema repository 160 in place of the schema that included the "Surname" data element.

Figure 7:
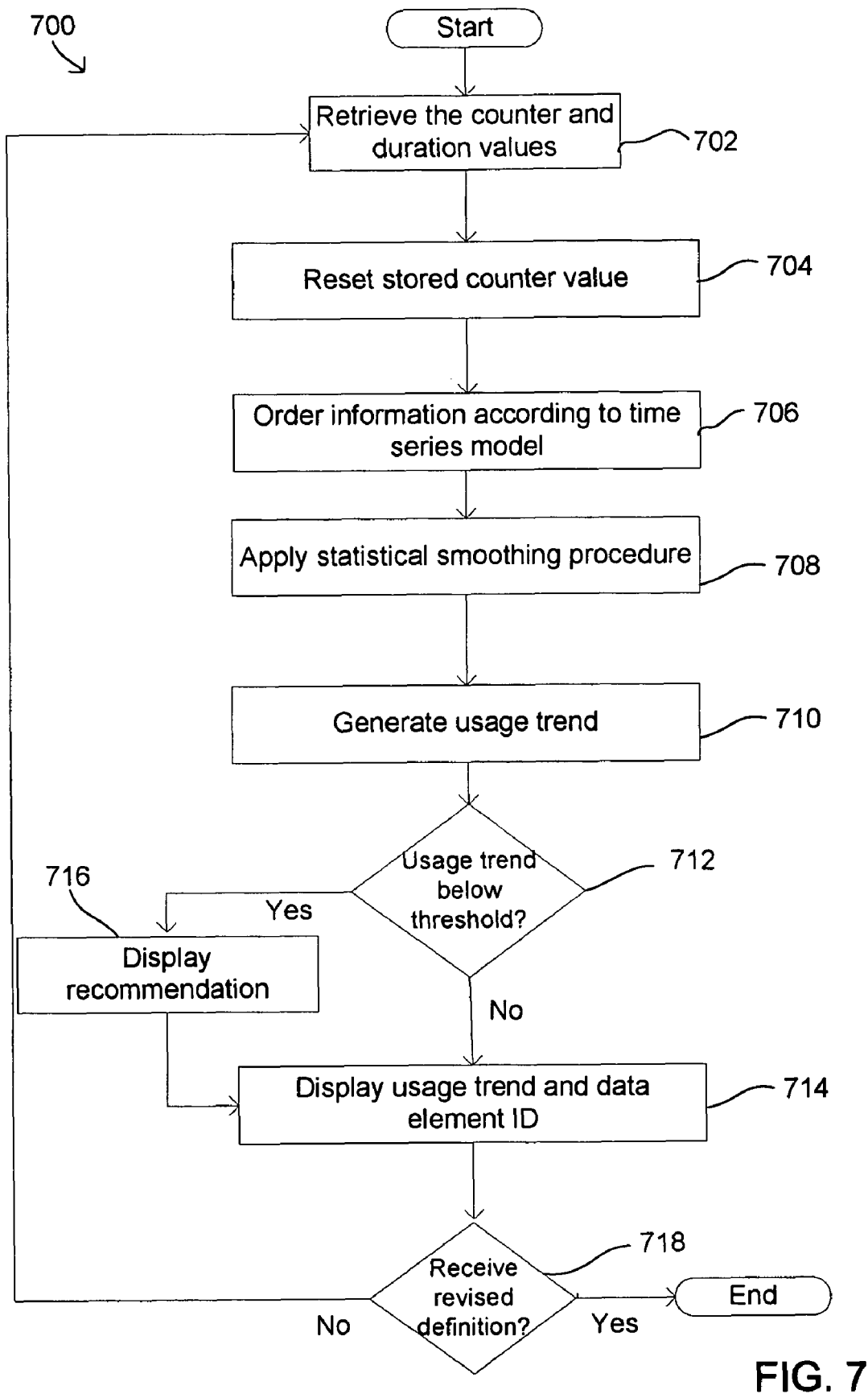
FIG. 7 is a flow diagram of a method for generating usage trends according to the implementation of the system shown in FIG. 6.

FIG. 7 is a flow diagram of the system 600 shown in FIG. 6. For example, the operations 700 can be performed in the intermediary computer 150. A processor executing instructions stored in a computer program product can perform the operations 700. The operations 700 may begin in step 702 with retrieving the counter and duration value. For example, the collector module 620 may retrieve the counter value 618 and the duration value 622 periodically. The retrieval period may be based on the previously retrieved duration value 622.

In step 704, "Resets stored counter value" is performed. For example, the collector module 620 may reset the counter value 618 stored in the data element definition 610 to zero. Note, that the reset is performed after the collector module 620 retrieves the value for the entry 625 in the table 624 of the statistical database 175.

In step 706, "Order information according to time series module" is performed. For example the trend calculator 627 may use the time series module 628 to order the time period 626 and the associated counter value 618 according to a time series model. In step 708, "Apply statistical smoothing procedure" is performed. For example, the smoothing module 630 may analyze the linear trend of the element usage by means of linear regression. Additionally, the smoothing module 630 may forecast the usage of data elements using exponential smoothing.

In step 710, "Generate usage trend" is performed. For example, the trend calculator 627 may generate a usage trend from the time series model and smoothing procedures. The usage trend may indicate the historical and future predicted usage of the data element.

In step 712, a determination whether the "Usage trend is below threshold" is performed. The trend calculator 627 may compare the usage trend generated in step 710 with a usage trend threshold. The usage trend threshold may be accessed by the trend calculator 627 and compared with the generated usage trend. If the usage trend is below the usage trend threshold, step 716 may be performed, and if the usage trend as above the usage trend threshold, step 714 may be performed. For example, the usage trend threshold may be an indicator specifying the data element has been used in the last year. If the usage trend indicates that the data element has not been used in the last year, step 716 may be performed. If the usage trend indicates that the data element has been used in the last year, step 714 may be performed.

In step 714, "Display usage trend and data element ID" is performed. For example, the trend calculator 627 may transmit the usage trend 632 and the data element ID 636 to the display 634. The user may view the display to determine the usage trend 632 associated with the element ID 636. If the usage trend is below the threshold as discussed in 712, step 716 "Display recommendation" is performed. For example, the trend calculator 627 may transmit a recommendation to the display. The recommendation may prompt the user to delete the data element specified by the data element ID 636. Additionally, the recommendation may prompt the user to merge the data element with another data element.

In step 718, a determination "Receive revised definition?" is performed. For example, the user may respond to the recommendation to delete the data element corresponding to the data element ID 636. The user accesses the schema 605 in the schema repository 160 and deletes the data element definition 610. The schema repository 160 may then receive and store this revised schema definition 640. If the revised definition 640 is received, the operations may end. If the user does not modify or delete the definitions of the schema 605, step 702 may be performed. The steps 702-718 may be performed repeatedly to present an updated usage trend for the data element.

Figures 8, 9:
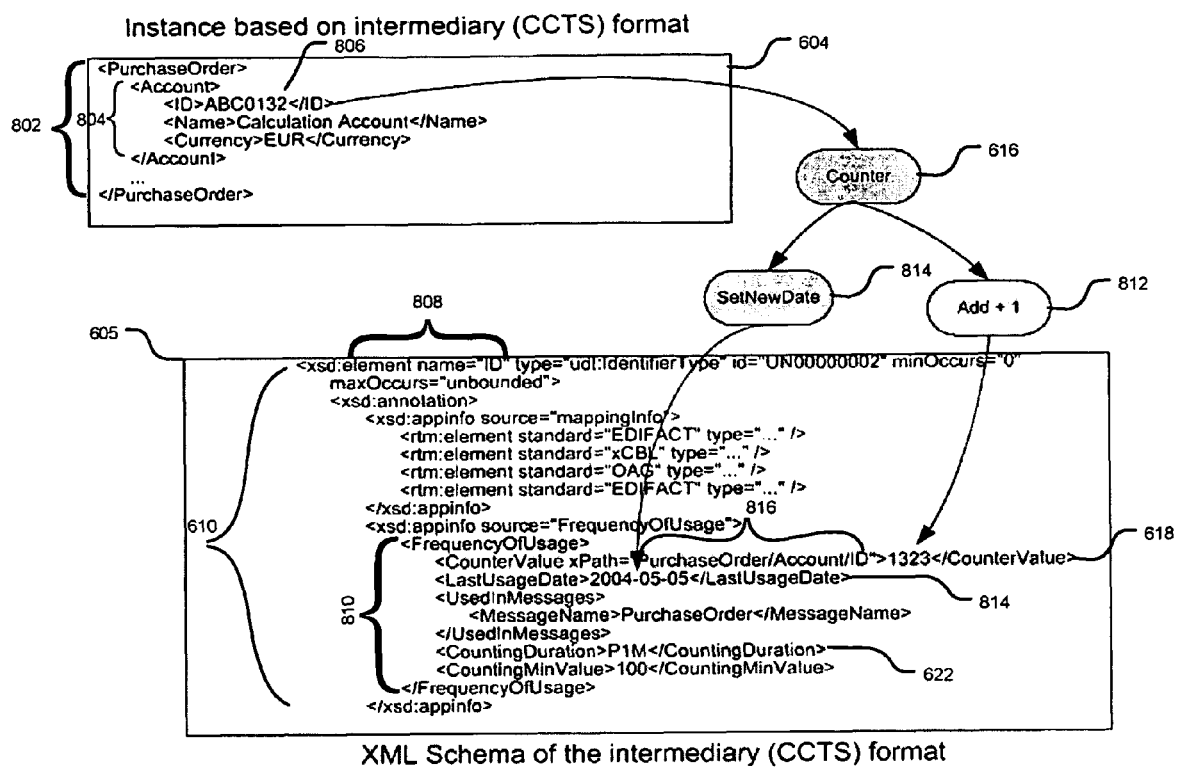
FIG. 8 shows XML excerpts from an intermediate electronic document and a schema.
FIG. 9 is a table with time periods and corresponding counter values.

FIG. 8 shows XML excerpts from the intermediate electronic document 604 and the schema 605. The intermediate electronic document 604 may include a purchase order data element, which is specified by the purchase order XML tag 802. The purchase order data element also includes an account data element, which is specified by the account XML tag 804. The account data element, in turn, includes the data element ID specified by the ID XML tag 806. Each of the data elements may have associated usage trends. Here, only the usage trend for the ID data element is described; however, a similar method and system is applicable for the other data elements.

The counter module 616 may access the schema 605 and locate the data element definition 610 associated with the data element ID by comparing the ID XML tag 806 with the element name 808. The counter module 616 may then locate a frequency of usage XML tag 810 and increment the counter value 618 as indicated by the "Add+1" bubble 812. The counter module 616 may also record the date that the data element ID 806 is received in a "LastUsageDate" XML tag 814. This is indicated by the "SetNewDate" bubble 814.

If the data element ID 806 is used within other data elements besides the account and purchase order data elements, the counter corresponding to the data element ID associated with the account and purchase order data elements may be specified by an xPath 816.

FIG. 9 shows the table 624 with time periods and corresponding counter values. The collector module 620 may retrieve the counter value 618 from the data element definition 610 at the time period 626. In FIG. 9 the first time period is "1" and the counter value after period "1" is 2232. After the collector module 620 has retrieved the value 2232 from the data element definition 610, the counter value 618 may be reset to zero and may count the instances of the data element detected until time period "2". When this time period has passed, the collector module 620 may retrieve the new counter value 1342 and store it in the table 624.

Figure 10:
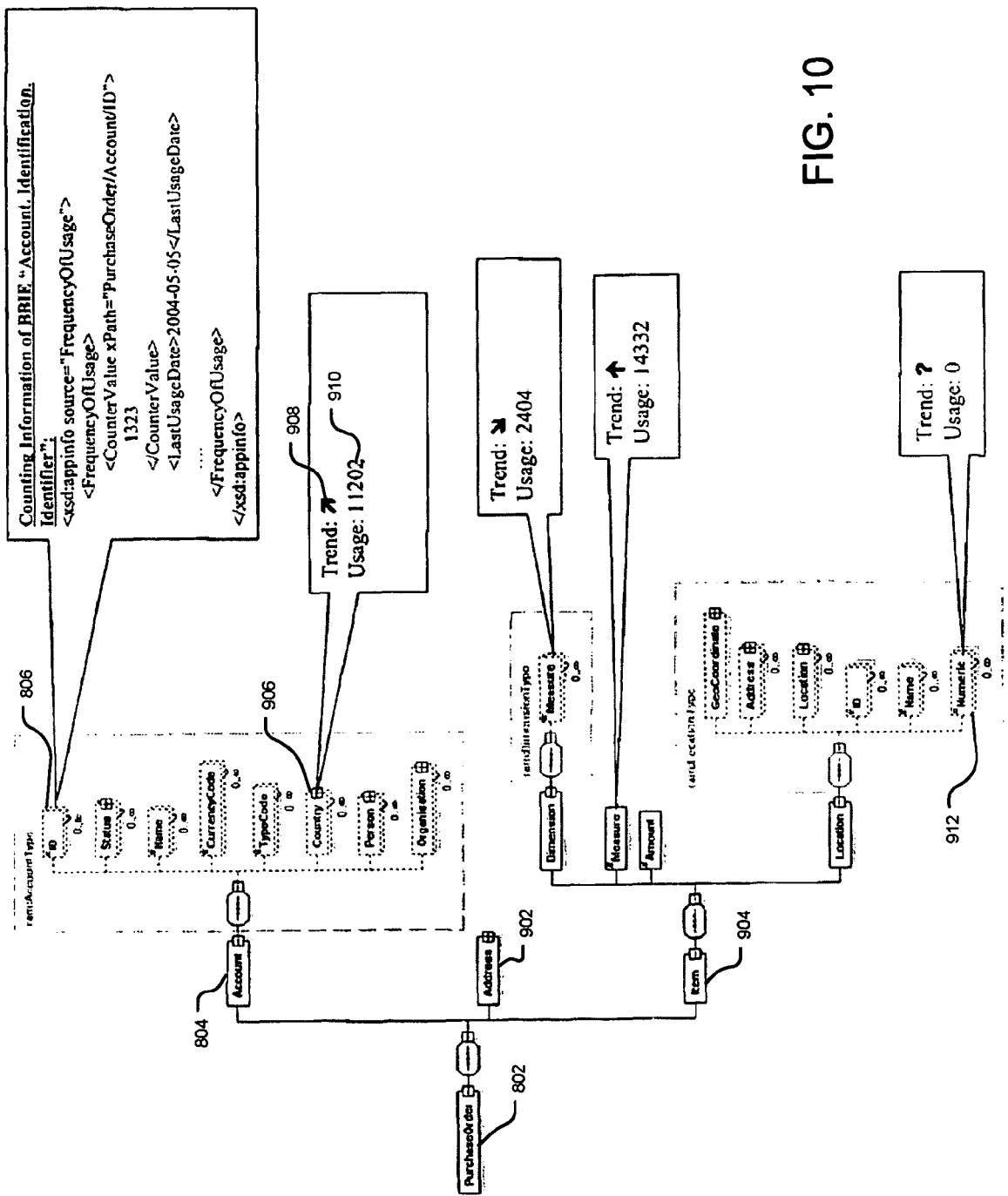
FIG. 10 is a schematic representation of several data elements and associated usage trends.

FIG. 10 is a schematic representation of several data elements and associated usage trends. The intermediate electronic document 604 may include the purchase order data element 802, which in turn, may include the account data element 804, an address data element 902, and an item data element 904. The account data element 804 may also include data elements, such as the ID data element 806 discussed in association with the FIG. 8. The account data element 804 also includes other data elements, such as the country data element 906. The country data element 906 may have its own usage trend 908 and a current count value 910.

The data element definition for the country data element 906 may be located in the same schema 605 as the data element ID 806. Other data element definitions, such as the definition for the numeric data element 912 may be located in a separate schema associated with the location data element in the schema repository 160. Alternatively, both the country data element 906 and the numeric data element 912 may be located within a schema associated with the purchase order data element 802.

Figure 11A:
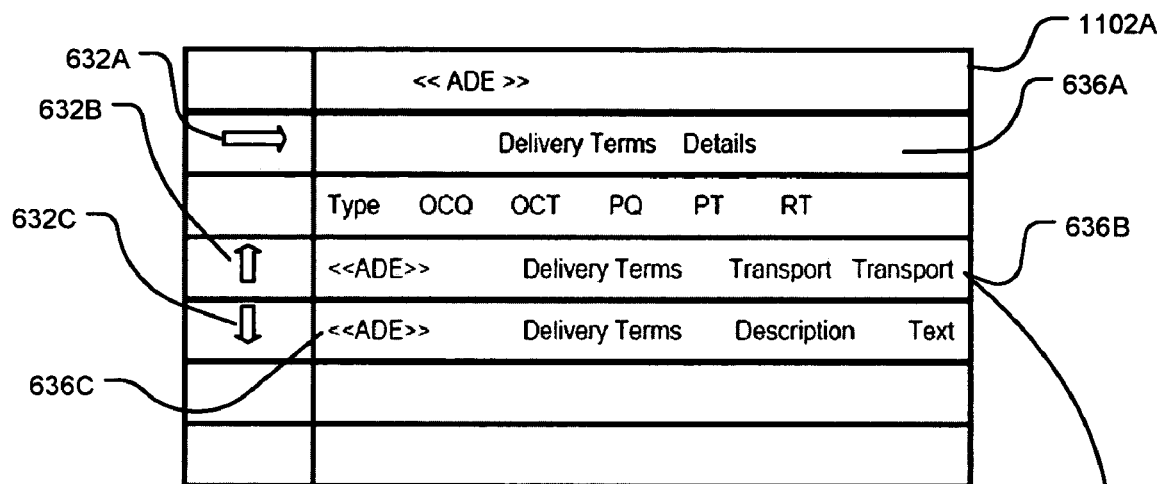
FIGS. 11A and 11B show GUIs (graphic user interfaces) generated by a system according to one implementation.
Figure 11B:
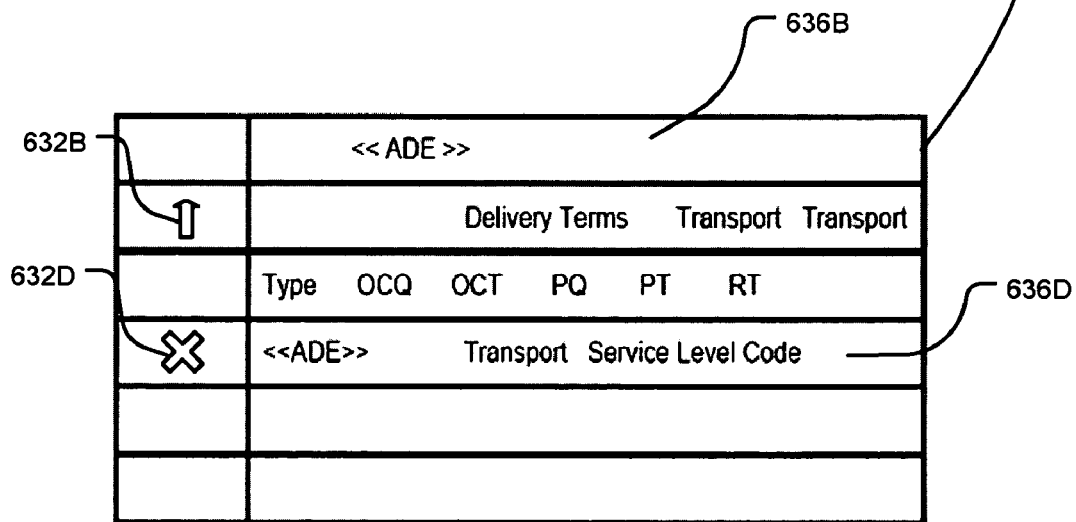

FIGS. 11A and 11B show GUIs (graphic user interfaces) generated by the system 600 according to one implementation. FIG. 11A is an aggregate data element (ADE) 1102 labeled with an ID data element "Delivery Terms.Details" 364A that is presented to a user on the display 634. Next to the ID data element 636A is a usage trend 632A associated with the "Delivery Terms.Details" data element. The usage trend 632A is a horizontal pointing arrow, which indicates the usage trend for the associated data element is a neutral trend that is neither increasing nor decreasing.

The ADE 1102 includes several other data elements, such as a Delivery Terms.Transport.Transport ADE 636B and a Delivery Terms.Description.Text data element (DE) 636C with associated usage trends 632B and 632C, respectively. The usage trend 632B indicates that the Delivery Terms.Transport.Transport ADE 636B has an increasing usage trend. This may mean that the time series model indicates that the counter module 616 has increasingly detected the ADE over a measured period of time.

Additionally, as shown in FIG. 11B, a user may view a data element included within the ADE 1102 by selected the data element. For example, a user may select the ADE 636B. The display may be updated to show the ADE 636B and its sub-elements, such as the Transport Service.Level.Code DE 636D. The DE 636D has an associated usage trend 632D represented by an "X." The "X" may represent that the DE has not been used in a measured time of two years. Other usage trend symbols may be used. For example, and a "?" may indicate the DE has not been used for half a year, a "!" may indicate the DE has not been used for a year, and vertical arrows pointing up or down may indicate that the usage trend is increasing or decreasing, respectively, over the last half a year.

In one implementation, the trend calculator 627 uses an additive time series model to estimate the usage trends. The model is composed of a trend component (G), a seasonal component (S), and in a regular component (R), and corresponds to the equation:

$$y_t = G_t + S_t + R_t \text{ for } t=1, 2, \ldots n,$$

The component $G_t$ may describe a course of the time series without seasonal or irregular variations. Additionally, the component $G_t$ may be comprised of a trend component and a cyclic component. The trend component may depend on long term observed trends and may be weighted more heavily in evaluations of data elements. For example, the trend calculator 627 may weight the trend component of $G_t$ with coefficients that increase its effect when comparing it to a threshold used to make a recommendation. The cyclic component may correspond to a business cycle, and the trend calculator 627 may weight it less than the trend component $G_t$ when comparing the usage trend to the usage trend threshold.

The component $S_t$ may indicate the data element's usage associated with a season. For example, the component may indicate that there is a surge in ID data elements associated with coats during autumn months. This may be used in mapping data elements from one definition to another. For example, the data element 612 associated with a data element definition in a first schema is received at the translation structure 165. The structure 165 may map the data element 612 to the data element 608 using the schema 605.

Under some conditions, it may be unclear whether the data element 612 should be mapped using the data element definition 610 or another data element definition. A mapping module (not shown) may access the usage trend components $S_t$ corresponding to each of the data element definitions to determine which data element definition should be selected. In one implementation, the system automatically maps a definition based on statistical information. For example, if the data element definition 610 has a $S_t$ component that indicates it is heavily used in the fall, and a second data element definition has a $S_t$ component that indicates it is heavily used in the spring, then if the data element 612 is received in a fall month, it will be mapped using the data element definition 610. In another implementation, the system performs a semi-automatic mapping, where a user is first presented with a mapping recommendation based on statistical information, such as the $S_t$ component. If the user accepts the recommendation, the system then performs the mapping.

The component $R_t$ may describe short-term and irregularly observed trends. For example, a surge in ID data elements for electrical generators may be received and counted by the translation information structure 165 after a wide-scale blackout in a major city. This component may be minimized when the usage trend is calculated by assigning it coefficients that mitigate irregular increases or decreases.

In some implementations, the displayed usage trend may only include one of the components of the trend calculation. For example, an arrow beside the usage trend may be derived from the slope of the $G_t$ component. If the slope is increasing, the arrow points upward, and if it is decreasing, the arrow points downward.

Figure 12A:
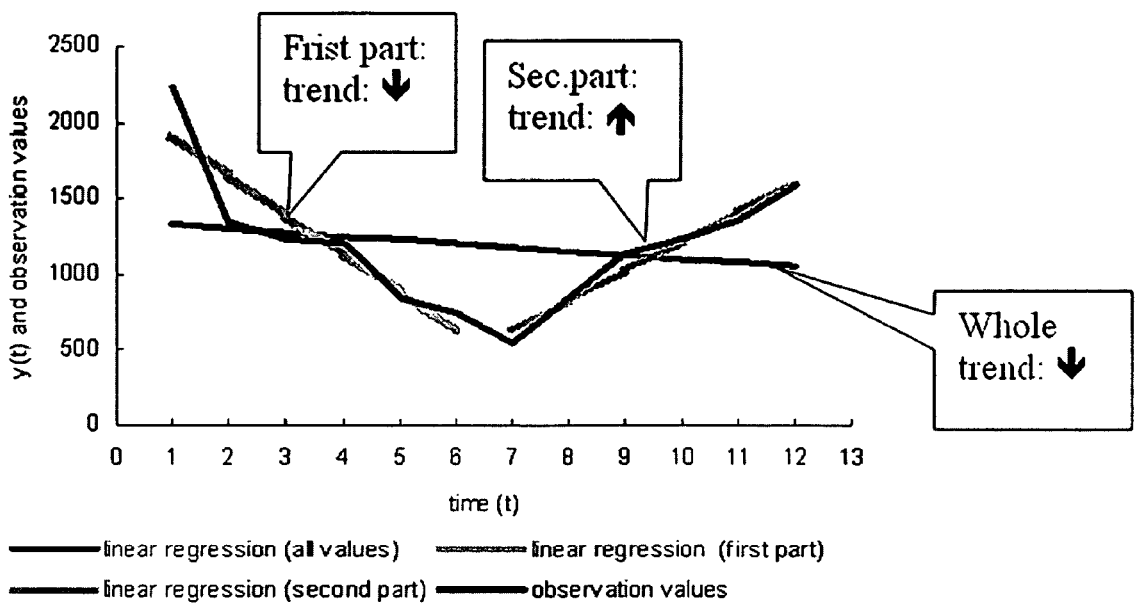
FIGS. 12A and 12B are graphs of smoothing procedure functions used in trend analysis.
Figure 12B:
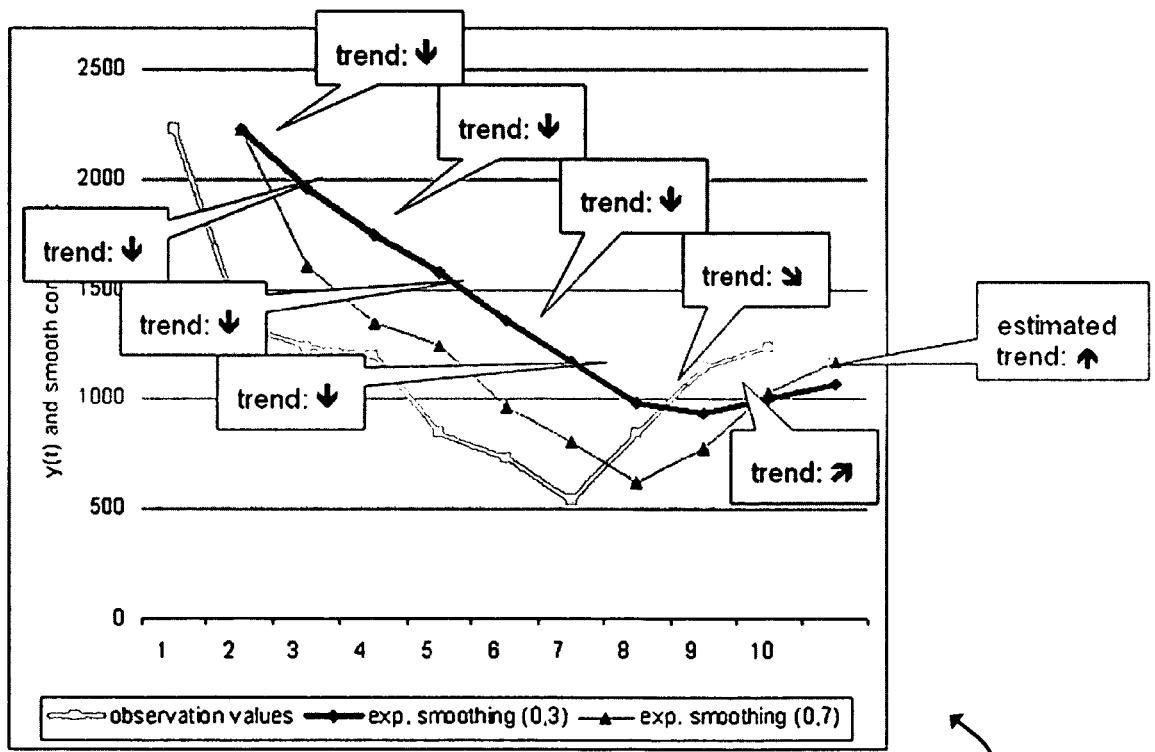

The smoothing module 630 may use smoothing procedures such as linear regression and exponential smoothing to facilitate trend estimation and decrease the effects of irregular and seasonal components. FIGS. 12A and 12B are graphs of the smoothing procedure functions used in trend analysis.

FIG. 12A is a graph of a linear regression analysis applied to the data stored in table 624 of FIG. 9. The linear regression procedures attempt to model the relationship between the two variables by fitting a linear equation to the observed data. The time period is an explanatory variable, and the count value is a dependent variable. The linear equation used may be:

$$y = a + bt,$$

where the intercept of the line is $$a = \bar{y} - b\bar{t},$$

the slope is $$b = \frac{\sum_{i=1}^{n}(t_i - \bar{t})(y_i - \bar{y})}{\sum_{i=1}^{n}(t_i - \bar{t})^2} \text{ for } 0 \leq B \leq 1$$

the correlation coefficient is $$\hat{y} = \frac{1}{n-1}\sum \left(\frac{x - \bar{x}}{S_x}\right)\left(\frac{y - \bar{y}}{S_y}\right)$$

where X is the time period and Y is the counter value, and the determination measure, which is the square of the correlation coefficient ŷ, is $$B = \frac{\frac{1}{n}\sum_{i=1}^{n}(\hat{y}_i - \bar{y})^2}{\frac{1}{n}\sum_{i=1}^{n}(y_i - \bar{y})^2}$$

Using the above equations, the linear regression values are produced in the following table and graphed in FIG. 12A:

TABLE 1

| t | $y_t$ |
|---|---|
| 2 | 1342 |
| 3 | 1232 |
| 4 | 1202 |
| 5 | 843 |
| 6 | 738 |
| 7 | 543 |
| 8 | 845 |
| 9 | 1143 |
| 10 | 1235 |
| 11 | 2232 |
| 12 | 1342 |
| Linear regression (all values) | |
| a = | 1359.24 |
| b = | −25.68 |
| B = | 0.0435 |

TABLE 1-continued

| t | $y_t$ |
|---|---|
| Linear regression for negative and positive trend | |
| First part (t = 1 to 6) | |
| $a_1$ = | 2164.53 |
| $b_1$ = | −257.06 |
| $B_1$ = | 0.8249 |
| Second part (t = 7 to 12) | |
| $a_2$ = | −745.70 |
| $b_2$ = | 196.37 |
| $B_2$ = | 0.9364 |

The linear regression may produce a rough trend usage and trend estimation for a data element. This may be presented to a user to provide a quick understanding of a general trend for the data element. For example, a user may select the usage trend arrow 632A in FIG. 11A. The selection may update the display to show the graph 1202 in FIG. 12A. Additionally, the slope of the line in the linear regression calculation of all the values may be used to determine the direction of the arrow displayed as a usage trend. For example, if the slope passes a defined threshold indicating it is a negative slope, the trend calculator may transmit the usage value 632C, which is displayed as a vertical arrow pointing down.

FIG. 12B shows counter values graphed using an exponential smoothing procedure. Use of the exponential smoothing procedure provides a smoothed time series $y_t^*$ for a data element based on historically observed time series data $y_t$. The smoothed time series may be determined using the following equation:

$$y_t^* = \sum_{j=0}^{\infty} c_j y_{t-j-1}$$

where $c_j = \alpha(1-\alpha)$ for j=0, 1, 2, 3 . . .

The weights $c_j$ decrease exponentially as j increases if the variable $\alpha$ is a value between 0 and 1. The lower the value of $\alpha$, the more distinct the result of the smoothing procedure. In some implementations, $\alpha$ is selected between $0.1 \leq \alpha \leq 0.3$. Table 2 below shows the smoothing difference between $\alpha$=0.3 and $\alpha$=0.7.

TABLE 2

| t | $y_t$ | $\alpha = 0.3$ | $\alpha = 0.7$ |
|---|---|---|---|
| 1 | 2232 | | |
| 2 | 1342 | 2232.00 | 2232.00 |
| 3 | 1232 | 1965.00 | 1609.00 |
| 4 | 1202 | 1745.10 | 1345.10 |
| 5 | 843 | 1582.17 | 1244.93 |
| 6 | 738 | 1360.42 | 963.58 |
| 7 | 543 | 1173.69 | 805.67 |
| 8 | 845 | 984.49 | 621.80 |
| 9 | 1143 | 942.64 | 778.04 |
| 10 | 1235 | 1002.75 | 1033.51 |
| 11 | estimated | 1072.42 | 1174.55 |

Additionally, exponential smoothing procedures may forecast the unknown value $y_{t+1}$, given a sufficiently large t, using the equation:

$$y_{t+1}^* = \sum_{j=0}^{t-1} c_j y_{t-j} = \sum_{j=0}^{t-1} \alpha(1-\alpha)^j y_{t-j}$$

Note that $y_1 \ldots y_t$ should be a trend and season adjusted time series. If $y^*_1 = y_1$, it is possible to iteratively determine $y_2^* \ldots y^*_t + 1$. The following equation may be used to estimate future usage trend values:

$$y^*_{t+1} = \alpha y_t + (1-\alpha) y^*_t$$

FIG. 12B shows a graph 1204 of the values from Table 1. The graph shows the ten observations ($y_1$-$y_{10}$) and one estimated value ($y_{11}$). The arrows show the trend between each observation. Arrows that have an ascending or descending slope represent transitional phases between negative, neutral, and positive trends.

A user may view the usage trend for a data element, such as the usage trend 632D in FIG. 11B and make an informed decision whether or not to delete the associated data element. In other words, the use of statistics in tracking data elements may facilitate schema evolution. For example, the usage trend 632D may indicate by appearing as an "X" that the data element Transport.Service_Level.Code has not been used for two years. If the user is a schema modeler, the user may delete the element from the schema because it has not been used for such a long period of time. In another example, the modeler may delete an element based on its relative usage when compared to a similar element. For instance, electronic business documents may contain a field for person's last name. The documents may use either a LastName data element or a Surname data element to hold the value representing the last name. The modeler may compare the LastName and Surname data elements to determine which is used more frequently. If the usage trend associated with the LastName data element is an upward pointing arrow, the usage trend may be increasing over a period of time, such as the last six months. If the usage trend associated with the Surname data elements is an "X," the usage trend indicates that the data element has not been used for six months. The modeler could choose to delete the Surname data element and replace all of its occurrences in schemas with the data element LastName.

Additionally, the modeler may use the usage trend for a data element to determine whether to merge properties of a data element with another data element. For example, the Surname data element may be an aggregate data element that includes the sub-data element Suffix. The sub-data element Suffix may hold last name suffixes, such as Jr. or III. The modeler may select the Surname data element and the display may update to show the elements included in the Surname data element. The usage trends may indicate that of all the sub-data elements only the sub-data element Suffix has been used in the last six months. The other sub-elements may not have been used in over two years as indicated by their associated usage trends. The modeler may choose to move the data element Suffix from the element Surname to the element LastName, and may then delete the data element Surname. In this way, the Suffix sub-element may be included in an element that is used more frequently.

The usage trends for particular data elements may give modelers a better indication of what data elements will be used in business transactions. For example, if the modeler is creating a new schema for a business transaction, the modeler may select the data element LastName to include in the schema over the data element Surname. This selection is based on usage trends associated with these data elements that indicate the former data element is used much more often than the latter.

In some situations, the usage trend, at the summary level, may not appear to accurately indicate a data element's usage. For example, the usage trend associated with a data element WinterCoatID may indicate that it has not been used in the last six months if a modeler views the usage trend at the end of summer. However, the user could select the usage trend symbol to display a graph detailing the usage trend for the data element. Here, the user might see that the data element is used frequently in the late fall and winter months, but not in the late spring or summer months. Additionally, the user may be able to view the separate seasonal component of the usage trend. In this way, the user may be able to identify cyclic uses for a data element. In a similar manner, the user may be able to view irregular components of the usage trend.

Statistics, such as the described usage trends, and other data can be collected for business data elements of the first communication schema, the intermediary communication schema, and/or the second communication schema as well as any other communication schemas supported by the translation infrastructure 165. Accordingly, the statistics database 170 can collect usage information for a number of different schemas. In addition, statistics and other data can be collected for business data elements independent of any translation involving a schema that includes the business data elements. For example, the statistics database 175 can be incorporated into the first computer 110 and/or the second computer 120 for collecting statistics on electronic documents sent from or received at the first computer 110 and/or the second computer 120, respectively. In addition, the translation infrastructure 165 and associated intermediary schema repository 160 do not need to be in a separate location or computer 150 but can be incorporated into the first computer 110 or second computer 120. In cases where a business data element includes multiple different instances (e.g., a generic element that is used in multiple different electronic documents), the instances can be related to one another in a hierarchy, and each instance can have its own corresponding counter. Furthermore, incrementing of counters can be based on the location of the business data element, which is expressed by an xPath navigation path.

Figure 2:
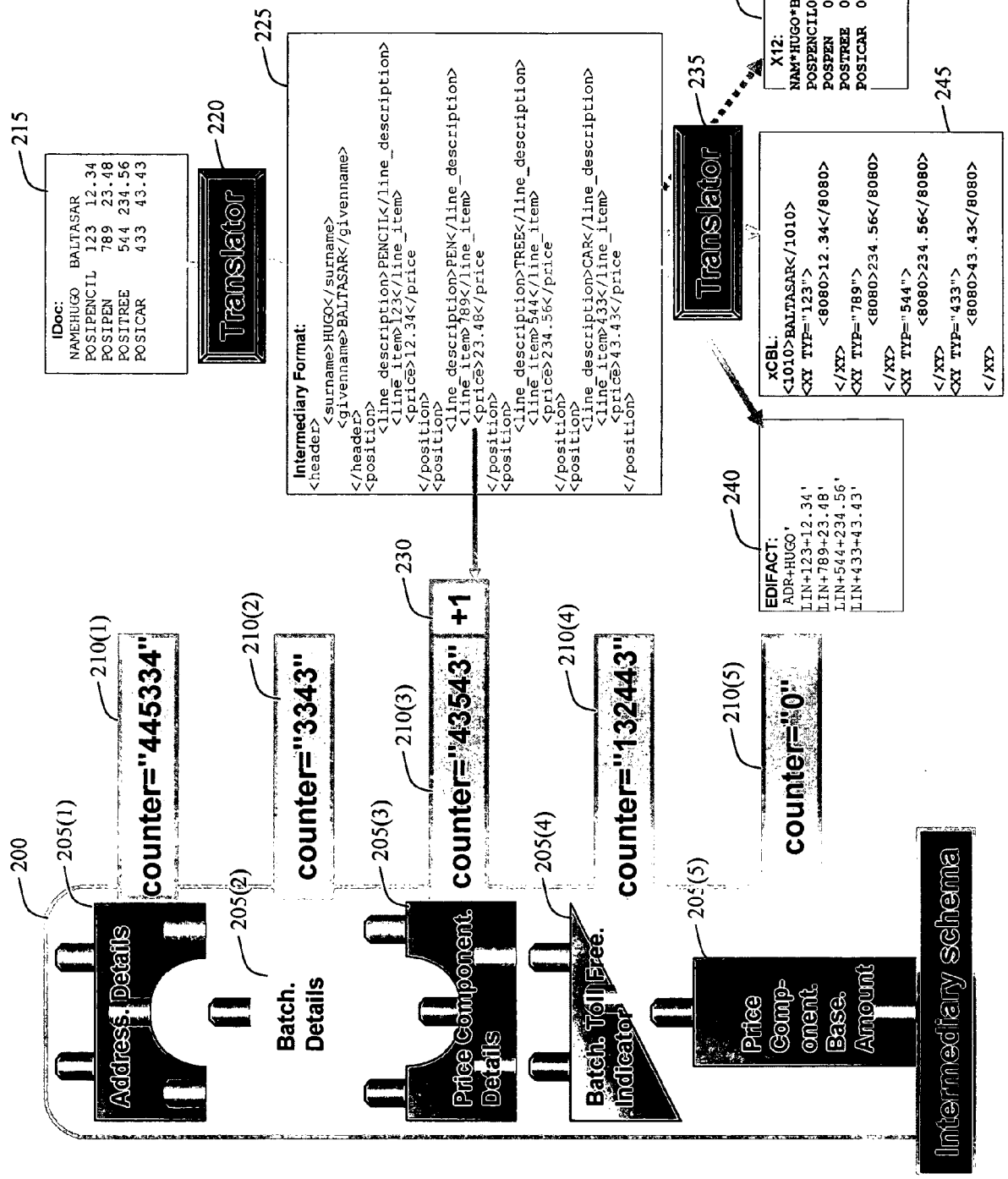
FIG. 2 is an illustration of counters for exemplary business data elements in an intermediary communication schema.

FIG. 2 is an illustration of counters for exemplary business data elements in an intermediary communication schema 200. The counters may be used to generate information used to determine the usage trends discussed above. For example, the intermediary communication schema 200 includes multiple different business data elements 205, including an "Address.Details" element 205(1), a "Batch.Details" element 205(2), a "Price Component.Details" element 205(3), a "Batch.Toll Free.Indicator" element 205(4), and a "Price Component.Base Amount" element 205(5). Each business data element 205 can be an aggregation of more basic business data elements 205 and/or can be combined with other business data elements 205 to form a higher-level business data element 205 (e.g., a complex element or a message). Each business data element 205 has an associated counter 210 that is incremented when an instance of the corresponding business data element 205 is identified.

An electronic document formatted in accordance with an IDoc schema format 215 is received at a translation module 220. The translation module 220 translates the electronic document into an intermediary schema format 225. For each different business data element 205 of the intermediary schema that includes at least one instance, the counter 210 corresponding to the business data element 205 is incremented. For example, if the electronic document, after translation into the intermediary schema format, includes one or more instances of the "Price Component. Details" element 205(3), the corresponding counter 210(3) is incremented (as indicated at 230). After inspecting the electronic document for instances of the various business data elements of the intermediary schema 200, the electronic document is delivered to a translation module 235 for translation into one or more of an EDIFACT schema format 240, an xCBL schema format 245, and/or an X12 schema format 250.

Similar counters can also be used for counting instances of business data elements for incoming electronic document formats (e.g., the IDoc schema format 215) and outgoing electronic document formats (e.g., the EDIFACT schema format 240, the xCBL schema format 245, and/or the X12 schema format 250). In addition, during translation of electronic documents, the translation modules 220 and 235 can use the values stored in the counters 210 and/or counters for elements in the incoming and outgoing schema formats as well as other data relating to the business data elements 205 (e.g., stored in the statistics database 175). For example, a translation module 220 might compare the counter value 210(3) for the "Price Component.Details" element 205(3) and the counter value 210(5) for the "Price Component.Base Amount" element 205(5) to select the "Price Component.Details" element 205(3) over the "Price Component.Base Amount" element 205(5). In some cases, the selection might also take into account the messages in which each of multiple possible elements have historically been used (e.g., to select an element that, although used infrequently, is used with a particular message type while a more frequently used element has not previously been used with the particular message type). Additionally, the counter values and their associated time values may be aggregated and use to develop usage trends to display to a user.

FIG. 3 is an excerpt from a sample XML definition 300 of a communication schema. The XML definition 300 includes a "PeriodType" element 305 that is an aggregation of a number of sub-elements, including a "DurationDateTime" element 310 and an "Indicator" element 315. Each of the "DurationDateTime" element 310 and the "Indicator" element 315 include a "FrequencyofUsage" set of attributes 320. A "counter value" attribute 325 stores a value corresponding to the number of electronic documents in which an instance of the element 310 or 315 appeared. The value is incremented each time another electronic document that includes an instance of the element 310 or 315 is received. The "counter value" attribute 325 is used to determine whether a particular element 310 or 315 is used relatively frequently or infrequently.

A "last usage date" attribute 330 stores a date on which the most recent usage in an electronic document occurred. The "last usage date" attribute 330 can be used to determine if the particular element 310 or 315 has been used recently. A "used in messages" attribute 335 identifies one or more messages (e.g., message types) in which an instance of the element 310 or 315 appeared and can be used to identify elements 310 or 315 that are used with only a limited number of messages. A "counting duration" attribute 340 defines a time period for which statistics are collected before analyzing the results and/or clearing the counter. A "counting minimum value" attribute 345 defines a threshold counter value. If the value in the "counter value" element 325 is less than the threshold value, the element 310 will be flagged for possible deletion at the end of the time period defined in the "counting duration" attribute 340.

Additional attributes can also be included. For example, the XML definition 300 can include an "always required indicator" attribute for elements that should not be deleted from the XML definition 300. It is possible to maintain statistics and information on usage of such elements (e.g., for use in selecting among similar business data elements during translation processes), but the statistics will not be used to determine whether the element can be deleted.

Figure 4:
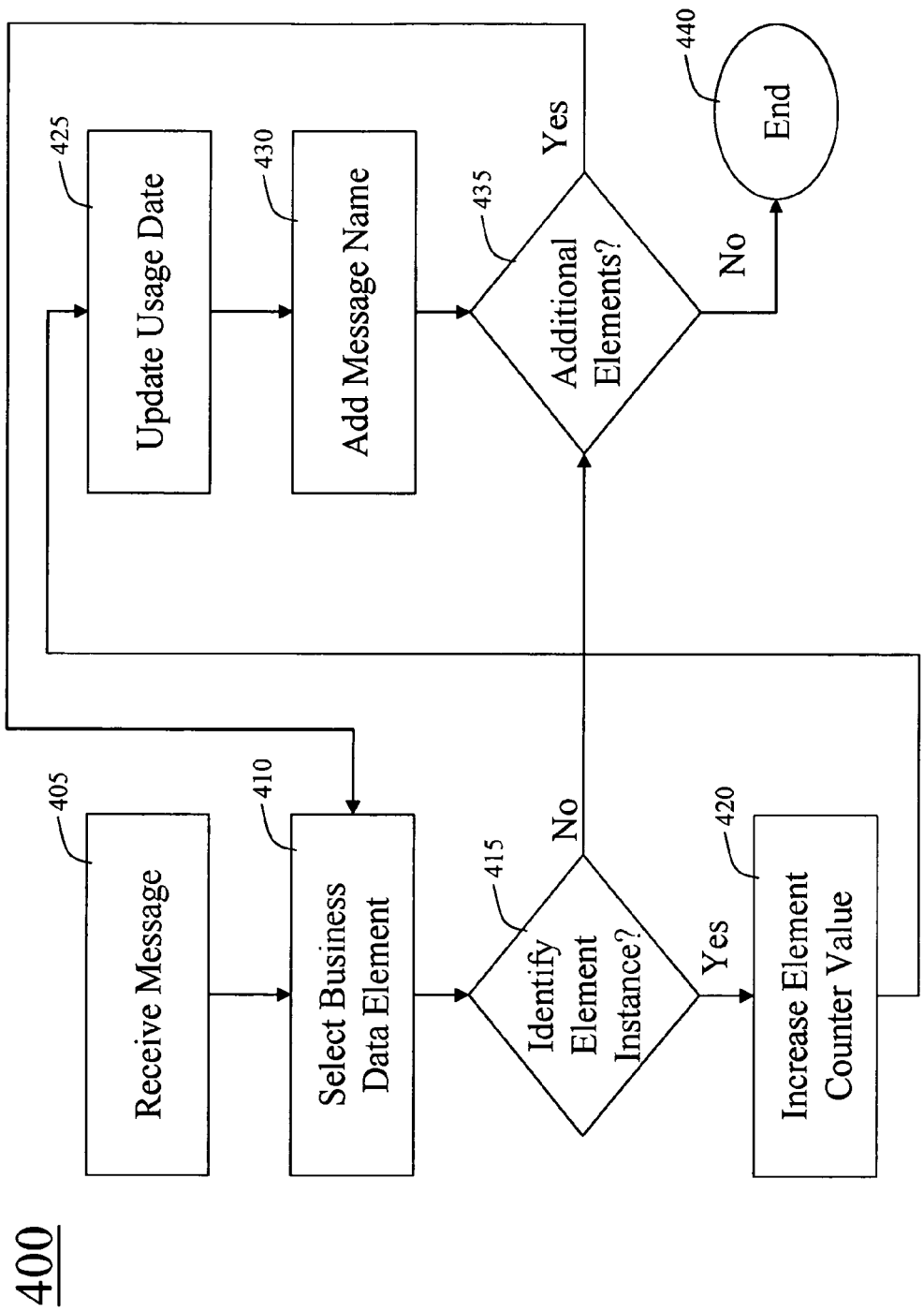
FIG. 4 is a flow diagram of a process for tracking usage of business data elements in received messages.

FIG. 4 is a flow diagram of a process 400 for tracking usage of business data elements in received messages. An electronic business message is received (405) at a translation module or during a process of sending or receiving a message from a transmitting computer (e.g., the first computer 110 of FIG. 1) or at a receiving computer (e.g., the second computer 120 of FIG. 1). The received message is interpreted, and a business data element for updating statistics is selected from the set of business data elements for a particular communication schema (410). It is determined whether an instance of the business data element exists in the message (415). If not, it is determined whether additional business data elements for the particular communication schema have not yet been checked (435). If there are additional data elements to be checked, the process 400 selects a new business data element (410).

If an instance of the business data element does appear in the message, a counter associated with the business data element is incremented (420). Data indicating the last usage date is updated to reflect the date of the current message (425), and the message name (e.g., describing the message type) is added to the usage information associated with the business data element (430). It is determined whether additional business data elements for the particular communication schema have not yet been checked (435). If so, the process 400 selects a new business data element (410). Otherwise, the process 400 ends (440).

Figure 5:
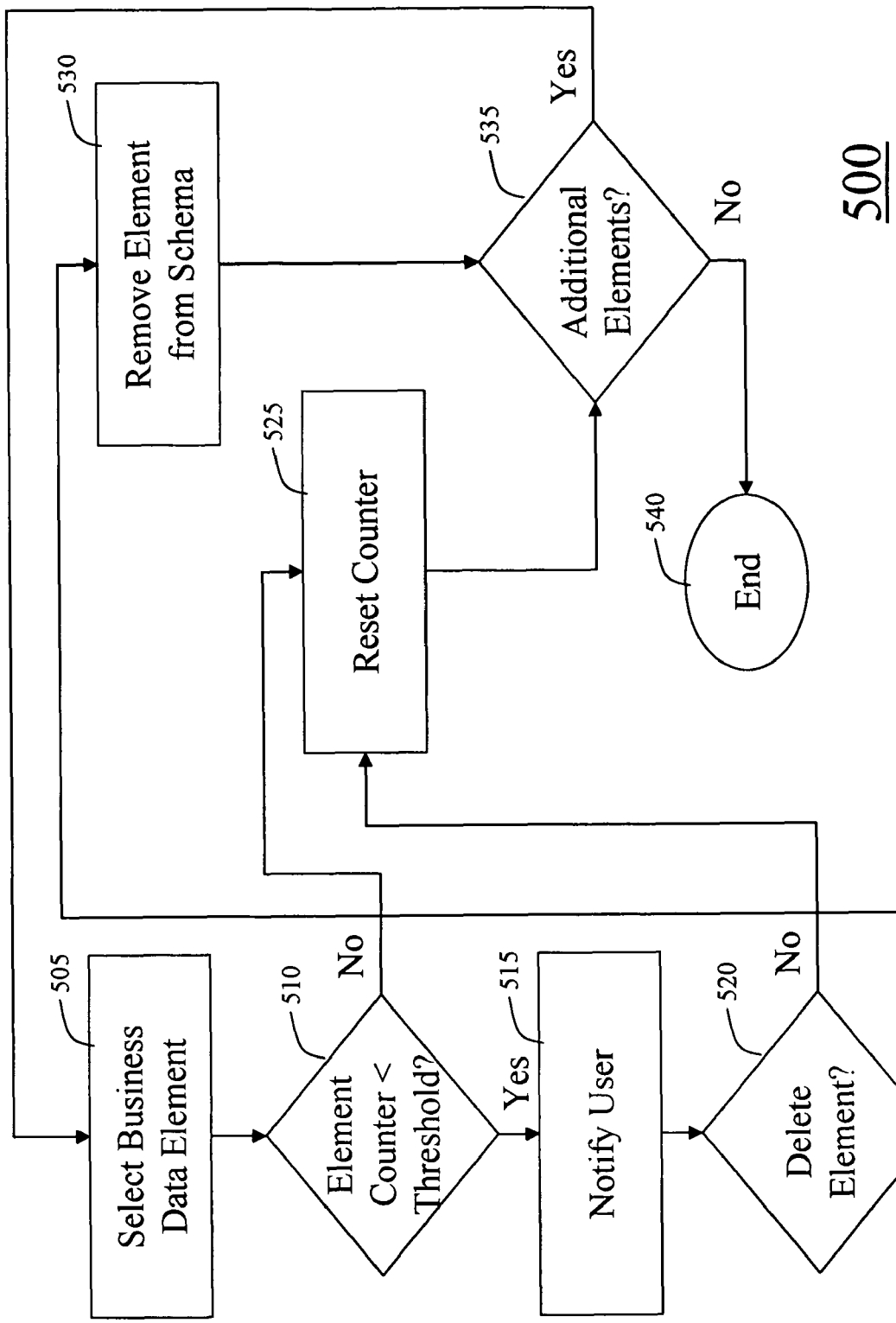
FIG. 5 is a flow diagram of a process for reviewing statistics and information relating to the business data elements in a communication schema.

FIG. 5 is a flow diagram of a process 500 for reviewing statistics and other information relating to the business data elements in a communication schema. Once a time period for counting instances of one or more business data elements (e.g., as defined by the "counting duration" attribute 340 of FIG. 3) has elapsed, a business data element from the communication schema is selected for purposes of reviewing the associated statistics (505). It is determined whether an instance counter corresponding to the selected business data element is less than a predefined threshold for the business data element (510). If not, it can be assumed that the business data element is used sufficiently frequently to warrant maintaining the business data element in the communication schema. Accordingly, the counter for the business data element is reset (525) to begin a new time period for counting instances, and it is determined whether statistics for additional elements still need to be checked (535).

If the instance counter corresponding to the selected business data element is less than a predefined threshold for the business data element, a user is notified and presented with statistics and/or other information relating to the business data element (515). For example, the user can be presented with the count value, the last usage date, and the message names in which the business data element appeared. In some cases, multiple different status levels corresponding to different threshold values can be used to indicate a level of urgency for deleting the particular business data element. For example, if usage of the business data element is significantly below the minimum threshold, a usage trend symbol, such as the usage trend "X" 632D in FIG. 11B, may indicate that the element is a more likely candidate for deletion. If the user decides to delete the element (520), the element is removed from the communication schema (530). Otherwise, the counter for the business data element is reset (525) to begin a new time period for counting instances. Once the element is deleted or the counter is reset, it is determined whether statistics for additional elements still need to be checked (535). If so, another business data element is selected (505) and the process 500 repeats. Otherwise, the process 500 ends (540).

The described embodiments and all of the functional operations described in this specification can be implemented in digital electronic circuitry, or in computer software, firmware, or hardware, including the structural means disclosed in this specification and structural equivalents thereof, or in combinations of them. The embodiments can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the described embodiments, can be performed by one or more programmable processors executing one or more computer programs to perform functions of the embodiments by operating on input data and generating output. The processes and logic flows can also be performed by, and apparatus of the described embodiments can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the embodiment can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the described embodiments, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments have been described, but other embodiments can be implemented and are within the scope of the following claims. For example, the operations can be performed in a different order and still achieve desirable results. As one example, the process depicted in FIG. 4 does not require the particular order shown, or sequential order, to achieve desirable results (e.g., the operations 420, 425, and 430 can be performed in a different order). In certain implementations, multitasking and parallel processing may be preferable. Other embodiments are within the scope of the following claims.

What is claimed is:

1. A computer program product tangibly embodied in a machine readable storage device, the computer program product including instructions that, when executed, perform operations for tracking data elements that are used in electronic documents, the operations comprising:

(i) monitoring a plurality of electronic documents that include one or more data elements, wherein the one or more data elements comprise metadata tags that identify a type of information associated with the metadata tags;

(ii) identifying whether an instance of a data element comprising a metadata tag is present in a first electronic document of the plurality of monitored electronic documents;

(iii) incrementing a counter value that reflects a number of times the data element is used during a time interval based on the identification of whether the data element comprising the metadata tag is present in the first electronic document, the counter value incremented once for the first electronic document regardless of how many times the data element is present in the first electronic document and regardless of how many times the first electronic document including the data element is accessed;

(iv) resetting the counter value at an end of the time interval and thereafter incrementing the reset counter value during a subsequent time interval based on the use of the data element during the subsequent time interval, in accordance with step (iii);

(v) periodically retrieving the counter value that reflects the number of times the data element is used during a time interval;
(vi) applying a calculation process to the information to determine a usage trend, and identifying a usage trend interface element based on the usage trend, for the data element that comprises the metadata tag;
(vii) using the usage trend to map the data element in a second electronic document to a data element in an intermediate document; and
(viii) providing a visual display on a display device that shows an identifier for the data element and the usage trend interface element, wherein the visual display of the usage trend interface element replaces a display of an earlier usage trend interface element for the data element corresponding to a previous time interval.

2. The computer program product of claim 1, wherein the operations further comprise mapping the data element in the intermediate document to a data element in a third electronic document.

3. The computer program product of claim 1, wherein the counter value is stored in a schema comprising a definition associated with the data element.

4. The computer program product of claim 3, wherein the operations further comprise deleting or modifying the definition based the usage trend for the data element.

5. The computer program product of claim 3, wherein the operations further comprise generating a recommendation to delete or modify-the definition based on the usage trend for the data element.

6. The computer program product of claim 3, wherein the operations further comprise receiving a revised definition for the schema.

7. The computer program product of claim 3, wherein the periodic retrieval comprises aggregating the retrieved counter value with a previously retrieved counter value that reflects a number of times the data element was used during a previous time interval.

8. The computer program product of claim 7, wherein the periodic retrieval further comprises resetting the stored information.

9. The computer program product of claim 1, wherein the calculation process comprises ordering the information according to a time series model.

10. The computer program product of claim 9, wherein the time series model comprises a component selected from a group consisting of a smooth trend component, a cyclic trend component, a seasonal trend component, and an irregular trend component.

11. The computer program product of claim 10, wherein the displayed usage trend comprises one component.

12. The computer program product of claim 9, wherein the calculation process further comprises applying a statistical smoothing procedure to the time series model.

13. The computer program product of claim 12, wherein the smoothing procedure comprises a linear regression calculation, an exponential smoothing calculation, or both.

14. The computer program product of claim 12, wherein the statistical smoothing procedure generates an estimate for a future trend usage.

15. The computer program product of claim 1, wherein the usage trend for the data element is displayed as a single symbol.

16. The computer program product of claim 15, wherein the usage trend varies graphically based on a value of the usage trend.

17. The computer program product of claim 1, wherein the usage trend indicates that the data element may be deleted because the element has not been used for a determined amount of time.

18. A computer program product tangibly embodied in a machine readable storage device, the computer program product including instructions that, when executed, perform a method for tracking usage data for a data element, the method comprising:
(i) creating a schema having definitions associated with data elements, wherein the data elements comprise metadata tags that identify a type of information associated with the metadata tags;
(ii) incrementing a counter value that reflects a number of times the data element comprising a metadata tag is used during a time interval based on an identification of whether one or more of the data elements is present in a plurality of monitored electronic documents, the counter value incremented once for a first electronic document in the plurality of documents regardless of how many times the one or more data elements is present in the first electronic document and regardless of how many times the first electronic document including the one or more data elements is accessed;
(iii) resetting the counter value at an end of the time interval and thereafter incrementing the resent counter value during a subsequent time interval based on the user of the data element during the subsequent time interval, in accordance with step (ii)
(iv) periodically retrieving the counter value that reflects the number of times each data element is used during a time interval;
(v) applying a calculation process to the information to determine a usage trend, and identifying a usage trend interface element for the usage trend, for each data element;
(vi) using the usage trend to map the data element in a second electronic document to a data element in an intermediate document;
(vii) providing a visual display on a display device that shows an identifier for a data element and a usage trend interface element associated with the data element, wherein the visual display of the usage trend interface element replaces a display of an earlier usage trend interface element for the data element corresponding to a previous time interval; and
(viii) receiving a revised schema definition.

19. A computer program product tangibly embodied in a machine readable storage device, the computer program product including instructions that, when executed, perform operations for tracking data elements that are used in electronic documents, the operations comprising:
(i) identifying an instance of a data element for semantically identifying information in a first electronic document comprising one or more data elements, the data element comprises a metadata tag and is instantiated based on a set of data element definitions;
(ii) incrementing a counter value based on the identification of the data element, the counter value reflecting a number of times that the data element is used within a time interval predefined in the set of data element definitions;
(iii) incrementing the counter value based on whether the data element is present in a second electronic document, the incrementing performed once for the second electronic document regardless of how many times the data element comprising a metadata tag is present in the second electronic document and regardless of how many times the second electronic document including the data element is accessed;

(iv) resetting the counter value at an end of the time interval and thereafter to incrementing the resent counter value during a subsequent time interval based on the use of the data element during the subsequent time interval, in accordance with steps (ii) and (iii);

(v) periodically retrieving the counter value;

(vi) storing, in a statistical database, (1) multiple counter values based on periodically retrieving the counter value; and (2) a time period associated with the counter value, the time period representing a retrieval time of the associated counter value;

(vii) applying a calculation process to information stored in the statistical database to determine a usage trend that indicates a historical and a future predicted usage, and identifying a usage trend interface element based on the usage trend, for the data element, the calculation process comprising:

ordering the counter values in the statistical database based on the time periods associated with the counter values according to a time series model;

applying a statistical smoothing procedure by analyzing a linear trend of the data element's usage; and generating the usage trend using the time series model and the smoothing procedure;

(viii) using the usage trend to map the data element in a third electronic document to a data element in an intermediate document; and (ix) providing a visual display on a display device that shows an identifier for the data element and a single symbol representing the usage trend, the identifier comprising a recommendation for the data element corresponding to the usage trend, wherein the single symbol replaces a display of an earlier single symbol for the data element corresponding to a previous time interval.

20. A computer program product tangibly embodied in a machine readable storage device, the computer program product including instructions that, when executed, perform operations for tracking data elements that are used in electronic documents, the operations comprising:

(i) identifying whether an instance of a data element comprising a metadata tag is present in a first electronic document comprising one or more data elements;

(ii) incrementing a counter value that reflects a number of times the data element comprising a metadata tag is used during a time interval based on the identification of whether the data element is present in the first electronic document, the counter value incremented once for the first electronic document regardless of how many times the data element is present in the first electronic document and regardless of how many times the first electronic document including the data element is accessed, wherein the counter value is stored in a schema comprising a definition associated with the data element;

(iii) resetting the counter value at an end of the time interval and thereafter incrementing the reset counter value during a subsequent time interval based on the use of the data element during the subsequent time interval, in accordance with step (ii);

(iv) periodically retrieving the counter value that reflects the number of times a data element is used in different electronic documents during a time interval;

(v) applying a calculation process to the information to determine a usage trend, and identifying a usage trend interface element based on the usage trend, for the data element;

(vi) using the usage trend to map the data element in a second electronic document to a data element in an intermediate document;

(vii) providing a visual display on a display device that shows an identifier for the data element and the usage trend interface element, wherein the visual display of the usage trend interface element replaces a display of an earlier usage trend interface element for the data element corresponding to a previous time interval; and (viii) deleting or modifying the definition based the usage trend for the data element.

21. The computer program product of claim 20, wherein the operations further comprise generating a recommendation to delete or modify the definition based on the usage trend for the data element.

22. The computer program product of claim 1, wherein the operations further comprise determining, at the end of the predetermined time interval, that the counter value is below a threshold, and, in response to the determination, providing a recommendation to the user to delete the data element from the set of data element definitions.

* * * * *